US012412454B2

(12) United States Patent
Dale et al.

(10) Patent No.: US 12,412,454 B2
(45) Date of Patent: Sep. 9, 2025

(54) GAMING SYSTEM AND METHOD WITH A PERSISTENT ELEMENT FEATURE

(71) Applicant: LNW Gaming, Inc., Las Vegas, NV (US)

(72) Inventors: Kellen Dale, Reno, NV (US); Amy Robards, Sparks, NV (US); Colbee V. Jones, Reno, NV (US); Dougal Austin, Reno, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 332 days.

(21) Appl. No.: 18/153,581

(22) Filed: Jan. 12, 2023

(65) Prior Publication Data

US 2024/0242571 A1 Jul. 18, 2024

(51) Int. Cl.
*G07F 17/00* (2006.01)
*G07F 17/32* (2006.01)

(52) U.S. Cl.
CPC ...... *G07F 17/3267* (2013.01); *G07F 17/3213* (2013.01); *G07F 17/3258* (2013.01)

(58) Field of Classification Search
None
See application file for complete search history.

(56) References Cited

U.S. PATENT DOCUMENTS 3,733,075 A 5/1973 Hooker et al.
4,198,052 A 4/1980 Gauselmann
4,732,386 A 3/1988 Rayfiel
5,100,137 A 3/1992 Fulton
5,152,529 A 10/1992 Okada
5,205,555 A 4/1993 Hamano
5,342,047 A 8/1994 Heidel et al.
5,356,140 A 10/1994 Dabrowski et al.
5,393,061 A 2/1995 Manship et al.
(Continued)

FOREIGN PATENT DOCUMENTS

AU 2013251288 A1 5/2014
AU 2014202042 A1 5/2014
(Continued)

OTHER PUBLICATIONS

U.S. Appl. No. 18/153,644, Non-Final Office Action mailed Feb. 13, 2025, Entire Document.

*Primary Examiner* — Paul A D'Agostino

(57) ABSTRACT

There are provided a gaming machine and method that utilize game-logic circuitry and a presentation assembly configured to present a plurality of symbol-bearing reels, an array, and a plurality of persistent elements. The plurality of reels are spun and stopped to land symbols from the reels in the array. In response to the landed symbols including at least one accumulation symbol, an animation of addition of the accumulation symbol to one of the plurality of persistent elements is presented. A random determination whether or not to trigger one or more game features is made. If the determination is to trigger the one or more game features, a bonus mode is entered and the one or more game features are implemented via the game-logic circuitry for subsequent spins of the game, for any free games awarded during the subsequent spins, or any combination thereof until the bonus mode is terminated.

18 Claims, 13 Drawing Sheets

(56) References Cited

U.S. PATENT DOCUMENTS

| | | | | |
|---|---|---|---|---|
| 5,395,111 | A | 3/1995 | Inoue | |
| 5,431,408 | A | 7/1995 | Adams | |
| 5,511,781 | A | 4/1996 | Wood et al. | |
| 5,618,232 | A | 4/1997 | Martin | |
| 5,695,188 | A | 12/1997 | Shibashi | |
| 5,704,835 | A | 1/1998 | Dietz | |
| 5,722,891 | A | 3/1998 | Inoue | |
| 5,752,881 | A | 5/1998 | Inoue | |
| 5,766,074 | A | 6/1998 | Cannon et al. | |
| 5,788,573 | A | 8/1998 | Baerlocher et al. | |
| 5,807,177 | A | 9/1998 | Takemoto et al. | |
| 5,810,665 | A | 9/1998 | Takemoto et al. | |
| 5,833,537 | A | 11/1998 | Barrie | |
| 5,848,932 | A | 12/1998 | Adams | |
| 5,855,515 | A | 1/1999 | Pease et al. | |
| 5,876,284 | A | 3/1999 | Acres et al. | |
| 5,882,259 | A | 3/1999 | Holmes, Jr. et al. | |
| 5,882,261 | A | 3/1999 | Adams | |
| 5,890,962 | A | 4/1999 | Takemoto | |
| 5,911,418 | A | 6/1999 | Adams | |
| 5,941,772 | A * | 8/1999 | Paige | G07F 17/34 463/20 |
| 5,947,820 | A | 9/1999 | Morro et al. | |
| 5,951,397 | A | 9/1999 | Dickinson | |
| 5,988,638 | A | 11/1999 | Rodesch et al. | |
| 6,004,207 | A | 12/1999 | Wilson, Jr. et al. | |
| 6,027,115 | A | 2/2000 | Griswold et al. | |
| 6,033,307 | A | 3/2000 | Vancura | |
| 6,048,269 | A | 4/2000 | Burns et al. | |
| 6,050,895 | A | 4/2000 | Luciano, Jr. et al. | |
| 6,056,642 | A | 5/2000 | Bennett | |
| 6,089,976 | A | 7/2000 | Schneider et al. | |
| 6,089,977 | A | 7/2000 | Bennett | |
| 6,102,798 | A | 8/2000 | Bennett | |
| 6,120,031 | A | 9/2000 | Adams | |
| 6,142,873 | A | 11/2000 | Weiss et al. | |
| 6,159,097 | A | 12/2000 | Gura | |
| 6,162,121 | A | 12/2000 | Morro et al. | |
| 6,168,520 | B1 | 1/2001 | Baerlocher et al. | |
| 6,186,894 | B1 | 2/2001 | Mayeroff | |
| 6,203,429 | B1 | 3/2001 | Demar et al. | |
| 6,213,875 | B1 | 4/2001 | Suzuki | |
| 6,224,482 | B1 | 5/2001 | Bennett | |
| 6,224,483 | B1 | 5/2001 | Mayeroff | |
| 6,224,484 | B1 | 5/2001 | Okuda et al. | |
| 6,227,971 | B1 | 5/2001 | Weiss | |
| 6,241,607 | B1 | 6/2001 | Payne et al. | |
| 6,251,013 | B1 | 6/2001 | Bennett | |
| 6,270,411 | B1 | 8/2001 | Gura et al. | |
| 6,270,412 | B1 | 8/2001 | Crawford et al. | |
| 6,290,600 | B1 | 9/2001 | Glasson | |
| 6,309,300 | B1 | 10/2001 | Glavich | |
| 6,319,124 | B1 | 11/2001 | Baerlocher et al. | |
| 6,346,043 | B1 | 2/2002 | Colin et al. | |
| 6,364,766 | B1 | 4/2002 | Anderson et al. | |
| 6,375,567 | B1 | 4/2002 | Acres | |
| 6,375,570 | B1 | 4/2002 | Poole | |
| 6,413,162 | B1 * | 7/2002 | Baerlocher | G07F 17/3211 463/20 |
| 6,481,713 | B2 | 11/2002 | Perrie et al. | |
| 6,517,432 | B1 | 2/2003 | Jaffe | |
| 6,537,150 | B1 | 3/2003 | Luciano et al. | |
| 6,544,120 | B2 | 4/2003 | Ainsworth | |
| 6,547,242 | B1 | 4/2003 | Sugiyama et al. | |
| 6,551,187 | B1 | 4/2003 | Jaffe | |
| 6,554,704 | B2 | 4/2003 | Nicastro et al. | |
| 6,558,254 | B2 | 5/2003 | Baelocher et al. | |
| 6,561,900 | B1 | 5/2003 | Baerlocher et al. | |
| 6,561,904 | B2 | 5/2003 | Locke et al. | |
| 6,565,434 | B1 | 5/2003 | Acres | |
| 6,641,477 | B1 | 11/2003 | Dietz | |
| 6,652,378 | B2 | 11/2003 | Cannon et al. | |
| 6,656,040 | B1 | 12/2003 | Brosnan et al. | |
| 6,657,923 | B2 | 12/2003 | Laughlin | |
| 6,692,356 | B2 | 2/2004 | Baerlocher et al. | |
| 6,702,675 | B2 | 3/2004 | Poole et al. | |
| 6,731,313 | B1 | 5/2004 | Kaminkow | |
| 6,749,502 | B2 | 6/2004 | Baerlocher | |
| 6,786,818 | B1 | 9/2004 | Rothschild et al. | |
| 6,832,957 | B2 | 12/2004 | Falconer | |
| 6,837,790 | B1 | 1/2005 | Kaminkow | |
| 6,855,053 | B2 | 2/2005 | Baerlocher | |
| 6,869,360 | B2 | 3/2005 | Marks et al. | |
| 6,878,061 | B2 | 4/2005 | Baerlocher et al. | |
| 6,896,617 | B2 | 5/2005 | Daly | |
| 6,910,962 | B2 | 6/2005 | Marks et al. | |
| 6,916,243 | B2 | 7/2005 | Yoshida | |
| 6,918,834 | B2 | 7/2005 | Vancura | |
| 6,921,334 | B1 | 7/2005 | Bennett | |
| 6,926,609 | B2 | 8/2005 | Martin | |
| 6,935,947 | B1 * | 8/2005 | Singer | G07F 17/3244 463/16 |
| 6,960,134 | B2 | 11/2005 | Hartl et al. | |
| 6,964,416 | B2 | 11/2005 | Mcclintic et al. | |
| 7,018,293 | B2 | 3/2006 | Brown et al. | |
| 7,029,395 | B1 | 4/2006 | Baerlocher | |
| 7,029,396 | B2 | 4/2006 | Jaffe et al. | |
| 7,065,215 | B2 | 6/2006 | Shirakawa et al. | |
| 7,112,136 | B2 | 9/2006 | Anderson et al. | |
| 7,121,945 | B2 | 10/2006 | Suganuma et al. | |
| 7,137,886 | B2 | 11/2006 | Locke et al. | |
| 7,147,559 | B2 | 12/2006 | Englman | |
| 7,156,740 | B2 | 1/2007 | Kaminkow | |
| 7,179,169 | B2 | 2/2007 | Beaulieu et al. | |
| 7,252,591 | B2 * | 8/2007 | Van Asdale | G07F 17/3262 463/20 |
| 7,294,055 | B2 | 11/2007 | Baerlocher et al. | |
| 7,316,613 | B2 | 1/2008 | Luccesi et al. | |
| 7,371,170 | B2 | 5/2008 | Cregan et al. | |
| 7,377,850 | B2 | 5/2008 | Shackelford et al. | |
| 7,431,646 | B2 | 10/2008 | Jackson | |
| 7,452,276 | B2 | 11/2008 | Loose et al. | |
| 7,458,890 | B2 | 12/2008 | Loose et al. | |
| 7,473,174 | B2 * | 1/2009 | Cuddy | G07F 17/3244 463/16 |
| 7,488,252 | B2 | 2/2009 | Griswold et al. | |
| 7,494,412 | B2 | 2/2009 | Baerlocher | |
| 7,503,847 | B2 | 3/2009 | Baerlocher | |
| 7,513,828 | B2 * | 4/2009 | Nguyen | G07F 17/32 463/26 |
| 7,526,736 | B2 | 4/2009 | Kaminkow et al. | |
| 7,553,231 | B2 | 6/2009 | Rodgers et al. | |
| 7,578,735 | B2 | 8/2009 | Frizzell et al. | |
| 7,601,062 | B2 | 10/2009 | Cole et al. | |
| 7,604,538 | B2 | 10/2009 | Pacey | |
| 7,618,319 | B2 | 11/2009 | Casey et al. | |
| 7,625,278 | B2 | 12/2009 | Paulsen et al. | |
| 7,628,690 | B2 | 12/2009 | Englman et al. | |
| 7,631,872 | B2 | 12/2009 | Roemer et al. | |
| 7,654,895 | B2 | 2/2010 | Pacey | |
| 7,654,899 | B2 | 2/2010 | Durham et al. | |
| 7,699,699 | B2 | 4/2010 | Gilliland et al. | |
| 7,704,141 | B1 | 4/2010 | Marks et al. | |
| 7,744,460 | B2 | 6/2010 | Walker et al. | |
| 7,785,191 | B2 | 8/2010 | Marks et al. | |
| 7,789,744 | B2 | 9/2010 | Fiden | |
| 7,841,934 | B2 | 11/2010 | Gauselmann | |
| 7,980,936 | B2 | 7/2011 | Mead | |
| 8,021,223 | B2 | 9/2011 | Rose | |
| 8,021,225 | B2 | 9/2011 | Okada | |
| 8,066,563 | B1 | 11/2011 | Schultz et al. | |
| 8,083,581 | B2 | 12/2011 | Marks et al. | |
| 8,105,145 | B2 | 1/2012 | Jaffe | |
| 8,105,151 | B2 | 1/2012 | Caputo et al. | |
| 8,113,940 | B2 | 2/2012 | Hornik | |
| 8,147,322 | B2 | 4/2012 | Walker et al. | |
| 8,162,740 | B2 | 4/2012 | Aoki | |
| 8,162,741 | B2 | 4/2012 | Wadleigh et al. | |
| 8,192,275 | B2 | 6/2012 | Aoki et al. | |
| 8,246,442 | B1 | 8/2012 | Barrie | |
| 8,272,938 | B2 | 9/2012 | Gilmore et al. | |
| 8,287,357 | B2 | 10/2012 | Evans | |
| 8,323,091 | B2 | 12/2012 | Frank et al. | |
| 8,357,041 | B1 | 1/2013 | Saunders | |

(56) References Cited

U.S. PATENT DOCUMENTS 8,360,851 B2 1/2013 Aoki et al.
8,366,538 B1 2/2013 Saunders et al.
8,371,930 B1 2/2013 Saunders et al.
8,388,432 B2 3/2013 Mattice et al.
8,414,380 B2 4/2013 Saunders et al.
8,465,358 B2 6/2013 Kemper
8,480,473 B2 7/2013 Villejo et al.
8,496,522 B2 7/2013 Caputo et al.
8,512,121 B2 8/2013 Macvittie et al.
8,512,124 B2 8/2013 Bramble et al.
8,512,138 B2 8/2013 Saunders
8,523,659 B2 9/2013 Evans
8,574,059 B2 11/2013 Rodgers et al.
8,602,868 B2 12/2013 Johnson et al.
8,608,545 B2 12/2013 Arora et al.
8,662,986 B2 3/2014 Rodgers et al.
8,678,908 B2 3/2014 Nicely
8,690,660 B2 4/2014 Saunders et al.
8,696,434 B2 4/2014 Tsukahara
8,702,487 B2 4/2014 Thomas
8,771,054 B2 7/2014 Aoki et al.
8,790,169 B2 7/2014 Saunders
8,795,059 B2 8/2014 Aoki et al.
8,821,254 B2 9/2014 Tsukahara
8,834,258 B2 9/2014 Gobe et al.
8,851,974 B2 10/2014 Caputo et al.
8,870,642 B2 10/2014 Leupp et al.
8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,147,321 B2 9/2015 Moody
9,165,433 B2 10/2015 Caputo
9,177,447 B2 11/2015 Zoltewicz et al.
9,202,345 B2 12/2015 Zoltewicz et al.
9,214,011 B2 12/2015 Wei et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
9,275,524 B2 3/2016 Nicely
9,299,224 B2 3/2016 Leupp
9,311,781 B2 4/2016 Edwards
9,349,251 B2 5/2016 Caputo et al.
9,355,528 B2 5/2016 Nicely
9,418,521 B1 8/2016 Henrick et al.
9,424,720 B2 8/2016 Suda
9,430,900 B2 8/2016 Zoltewicz et al.
9,466,169 B2 10/2016 Basallo et al.
9,474,972 B2 10/2016 Lenger
9,495,839 B2 11/2016 Aoki et al.
9,595,157 B2 3/2017 Rasmussen et al.
9,633,506 B2 4/2017 Basallo et al.
9,704,342 B2 7/2017 Aoki et al.
9,928,691 B2 3/2018 Olive
9,978,221 B2 * 5/2018 Friedman ............ G07F 17/3265
10,013,855 B2 7/2018 Nakamura
10,037,651 B2 7/2018 You et al.
10,043,350 B2 8/2018 Gomez et al.
10,062,237 B2 8/2018 Devine et al.
10,089,819 B1 * 10/2018 Halvorson .......... G07F 17/3209
10,204,473 B2 2/2019 Lenger
10,242,533 B2 3/2019 Okada et al.
10,339,761 B2 7/2019 Olive
10,366,575 B2 7/2019 Visser
10,388,112 B2 8/2019 You et al.
10,410,472 B2 9/2019 Moody
10,417,877 B2 9/2019 Gomez et al.
10,475,294 B2 11/2019 Gomez et al.
10,497,203 B2 12/2019 Elmqvist
10,672,220 B2 6/2020 Lenger
10,706,664 B2 7/2020 Boese et al.
10,726,676 B2 7/2020 You et al.
10,769,888 B2 9/2020 You et al.
10,839,648 B2 11/2020 Okada et al.
10,957,161 B2 3/2021 Chesworth et al.
11,017,638 B2 5/2021 Chesworth et al.
2001/0021666 A1 9/2001 Yoshida et al.
2002/0016200 A1 2/2002 Baerlocher et al.
2002/0045474 A1 4/2002 Singer et al.
2002/0119818 A1 8/2002 Savio et al.
2002/0155881 A1 10/2002 Yoshida
2002/0183105 A1 12/2002 Cannon et al.
2003/0017865 A1 1/2003 Beaulieu et al.
2003/0027619 A1 2/2003 Nicastro, Sr.
2003/0035346 A1 2/2003 Laughlin
2003/0064782 A1 4/2003 Beaulieu et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157978 A1 * 8/2003 Englman ................. G07F 17/32
463/16
2003/0157980 A1 8/2003 Loose et al.
2003/0216165 A1 11/2003 Singer et al.
2004/0012145 A1 1/2004 Inoue
2004/0023714 A1 2/2004 Asdale
2004/0033827 A1 * 2/2004 Gilmore .................. G07F 17/32
463/20
2004/0043815 A1 3/2004 Kaminkow
2004/0048646 A1 3/2004 Visocnik
2004/0048651 A1 * 3/2004 Vorias ................. G07F 17/3262
463/20
2004/0092315 A1 5/2004 Boyd et al.
2004/0137982 A1 7/2004 Cuddy et al.
2004/0171417 A1 9/2004 Beaulieu et al.
2004/0195773 A1 * 10/2004 Masci ................. G07F 17/3244
273/317
2004/0198489 A1 10/2004 Kaminkow et al.
2005/0054442 A1 3/2005 Anderson et al.
2005/0130731 A1 6/2005 Englman et al.
2005/0159208 A1 7/2005 Pacey
2006/0009286 A1 1/2006 Durham et al.
2006/0063588 A1 3/2006 Poole
2006/0111173 A1 5/2006 Yang
2006/0142080 A1 6/2006 Enzminger
2006/0189369 A1 8/2006 Taylor
2006/0205469 A1 9/2006 Schultz et al.
2006/0247002 A1 11/2006 Yoshimi et al.
2007/0060248 A1 3/2007 Rodgers et al.
2007/0060255 A1 3/2007 Baerlocher et al.
2007/0060275 A1 3/2007 Gilmore et al.
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0032784 A1 2/2008 Englman
2008/0045298 A1 2/2008 Yoshizawa
2008/0045320 A1 2/2008 Kato
2008/0108408 A1 5/2008 Wolf
2008/0108411 A1 5/2008 Jensen et al.
2008/0108422 A1 5/2008 Hedrick et al.
2008/0108431 A1 5/2008 Cuddy et al.
2008/0132321 A1 6/2008 Pau
2008/0182647 A1 7/2008 Brunet De Courssou et al.
2008/0274789 A1 11/2008 Singer et al.
2009/0036208 A1 2/2009 Pennington et al.
2009/0048013 A1 * 2/2009 Castellari ............ G07F 17/3244
463/20
2009/0156287 A1 6/2009 Baumgartner
2009/0181755 A1 7/2009 Gagner et al.
2009/0239634 A1 9/2009 Nguyen
2009/0291741 A1 11/2009 Schofield
2010/0075737 A1 3/2010 Bluemel
2010/0113133 A1 5/2010 Leupp
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.

(56) References Cited

U.S. PATENT DOCUMENTS

| | | | | |
|---|---|---|---|---|
| 2010/0304832 | A1 | 12/2010 | Kup-Ferroth | |
| 2011/0244943 | A1 | 10/2011 | Milford et al. | |
| 2011/0300937 | A1 | 12/2011 | Crowder, Jr. et al. | |
| 2012/0015707 | A1 | 1/2012 | Hornik et al. | |
| 2012/0034965 | A1 | 2/2012 | Masen et al. | |
| 2012/0077564 | A1 | 3/2012 | Collette et al. | |
| 2012/0094738 | A1 | 4/2012 | Aoki et al. | |
| 2012/0122532 | A1 | 5/2012 | Berman et al. | |
| 2012/0178517 | A1 | 7/2012 | Montenegro et al. | |
| 2012/0220360 | A1 | 8/2012 | Mcallister et al. | |
| 2013/0023326 | A1* | 1/2013 | Saunders | G07F 17/3211 463/20 |
| 2013/0053124 | A1 | 2/2013 | Masen et al. | |
| 2013/0065663 | A1 | 3/2013 | Johnson et al. | |
| 2013/0102375 | A1 | 4/2013 | Aoki et al. | |
| 2013/0252704 | A1 | 9/2013 | Gilbertson et al. | |
| 2013/0260861 | A1 | 10/2013 | Vann et al. | |
| 2013/0310134 | A1* | 11/2013 | Daeges | G07F 17/3262 463/20 |
| 2013/0324217 | A1 | 12/2013 | Gilbertson et al. | |
| 2014/0014186 | A1 | 1/2014 | Bhattacharya et al. | |
| 2014/0024429 | A1 | 1/2014 | Aoki et al. | |
| 2014/0051496 | A1 | 2/2014 | Meyer | |
| 2014/0141860 | A1 | 5/2014 | Meyer | |
| 2014/0179396 | A1 | 6/2014 | Aoki et al. | |
| 2014/0248938 | A1* | 9/2014 | Tidke | G07F 17/32 463/20 |
| 2014/0274292 | A1 | 9/2014 | Suda | |
| 2014/0323198 | A1 | 10/2014 | Tuck | |
| 2014/0329591 | A1* | 11/2014 | Caputo | G07F 17/3258 463/29 |
| 2015/0031437 | A1 | 1/2015 | Gomez et al. | |
| 2015/0170462 | A1 | 6/2015 | Berman et al. | |
| 2015/0206386 | A1 | 7/2015 | Jaffe et al. | |
| 2015/0269809 | A1 | 9/2015 | Smith | |
| 2015/0287269 | A1 | 10/2015 | Berman | |
| 2015/0356833 | A1 | 12/2015 | Aoki et al. | |
| 2015/0379831 | A1 | 12/2015 | Lee et al. | |
| 2016/0042597 | A1 | 2/2016 | Olive | |
| 2016/0155303 | A1 | 6/2016 | Aoki et al. | |
| 2016/0180637 | A1* | 6/2016 | Honeycutt | G07F 17/3213 463/20 |
| 2017/0092043 | A1* | 3/2017 | Shiraishi | G07F 17/3213 |
| 2017/0092073 | A1* | 3/2017 | Nakamura | G07F 17/3213 |
| 2017/0154498 | A1 | 6/2017 | Olive | |
| 2017/0372558 | A1 | 12/2017 | You et al. | |
| 2018/0130303 | A1 | 5/2018 | Lamb | |
| 2018/0268655 | A1 | 9/2018 | Olive | |
| 2018/0268659 | A1 | 9/2018 | Chesworth et al. | |
| 2019/0043313 | A1* | 2/2019 | Cong | G07F 17/3213 |
| 2019/0051097 | A1 | 2/2019 | Marks et al. | |
| 2019/0102992 | A1 | 4/2019 | You et al. | |
| 2019/0236905 | A1 | 8/2019 | Washington et al. | |
| 2019/0371126 | A1* | 12/2019 | Bolling, Jr. | G07F 17/3244 |
| 2023/0394923 | A1 | 12/2023 | Debrabander | |
| 2024/0273975 | A1* | 8/2024 | Jaffe | G07F 17/3244 |

FOREIGN PATENT DOCUMENTS

| | | | |
|---|---|---|---|
| AU | 2015210489 | A1 | 2/2016 |
| GB | 2097160 | A | 10/1982 |
| GB | 2097160 | B | 5/1984 |
| GB | 2144568 | A | 3/1985 |
| GB | 2144568 | B | 9/1985 |
| GB | 2251112 | A | 6/1992 |

* cited by examiner

GAMING SYSTEM AND METHOD WITH A PERSISTENT ELEMENT FEATURE

RELATED APPLICATIONS

This application is related to U.S. patent application Ser. No. 18/153,644, entitled "Gaming System and Method With a Persistent Element Feature," filed on Jan. 12, 2023, which is hereby incorporated by reference in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2023, LNW Gaming, Inc.

FIELD OF THE INVENTION

The present invention relates to a technological improvement to gaming systems, gaming machines, and methods and, more particularly, to technological improvements in connection with a persistent element feature.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple game features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY OF THE INVENTION

There are provided a gaming machine and method that utilize game-logic circuitry and a presentation assembly configured to present a plurality of symbol-bearing reels, an array, and a plurality of persistent elements. The plurality of reels are spun and stopped to land symbols from the reels in the array. In response to the landed symbols including at least one accumulation symbol, an animation of addition of the accumulation symbol to one of the plurality of persistent elements is presented. A random determination whether or not to trigger one or more game features is made. If the determination is to trigger the one or more game features, a bonus mode is entered and the one or more game features are implemented via the game-logic circuitry for subsequent spins of the game, for any free games awarded during the subsequent spins, or any combination thereof until the bonus mode is terminated.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

FIG. 3A relates to a base-game portion of a wagering game; FIG. 3B relates to the awarding of one or more game features and a bonus mode that may be triggered as a result of the awarding of the game features.

FIG. 11A relates to a base-game portion of a wagering game; FIG. 11B relates to the awarding of one or more game features and a bonus mode that may be triggered as a result of the awarding of the game features.

Figure 1:
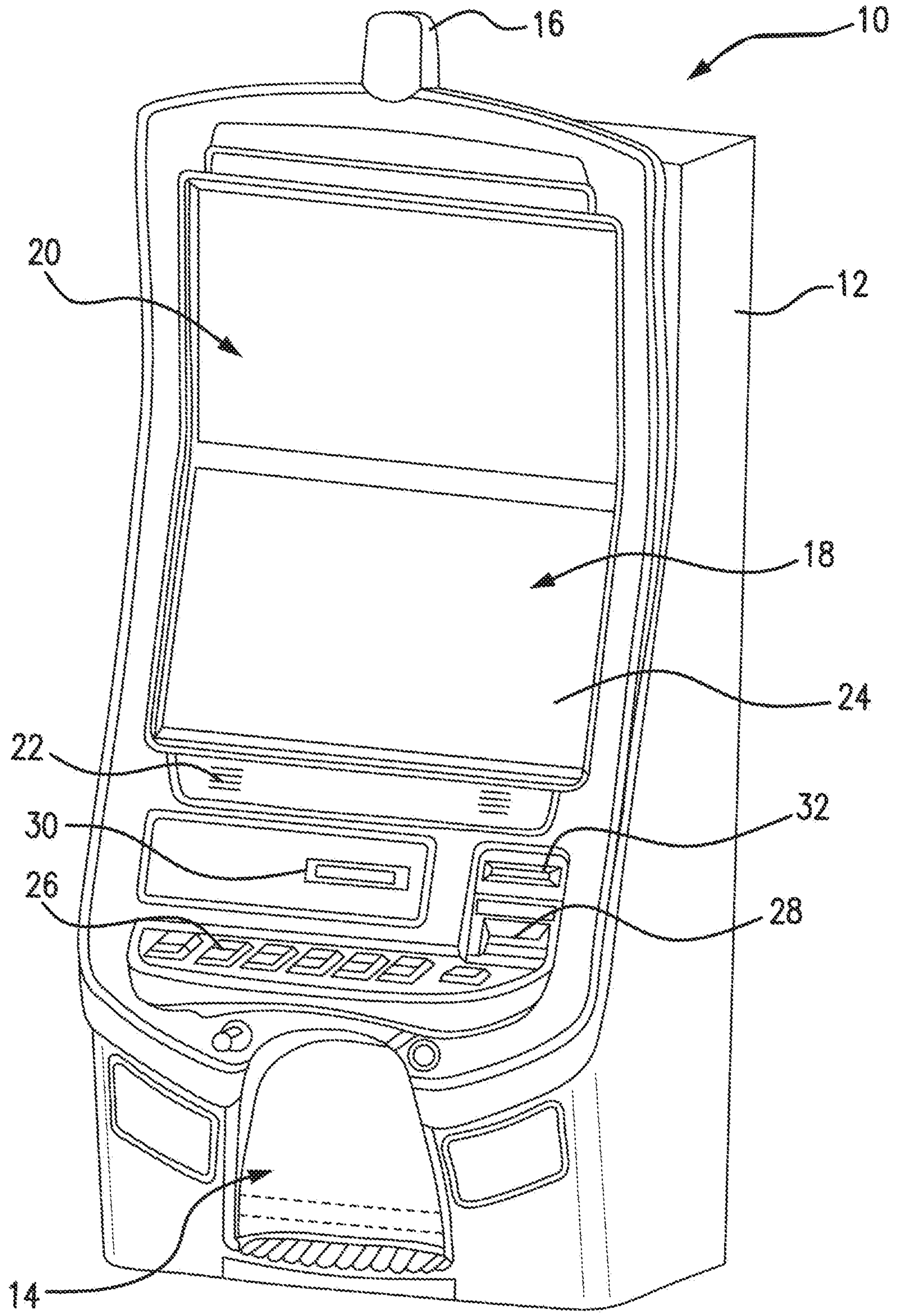
FIG. 1 is a front view of a free-standing gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls, and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary presentation device 18, a secondary presentation device 20, and one or more audio speakers 22. The primary presentation device 18 or the secondary presentation device 20 may be a mechanical-reel display device, a video display device, or a combination thereof. In one such combination disclosed in U.S. Pat. No. 6,517,433, a transmissive video display is disposed in front of the mechanical reel display to portray a video image superimposed upon electro-mechanical reels. In another combination disclosed in U.S. Pat. No. 7,654,899, a projector projects video images onto stationary or moving surfaces. In yet another combination disclosed in U.S. Pat. No. 7,452,276, miniature video displays are mounted to electro-mechanical reels and portray video symbols for the game. In a further combination disclosed in U.S. Pat. No. 8,591,330, flexible displays such as OLED or e-paper displays are affixed to electro-mechanical reels. The aforementioned U.S. Pat. Nos. 6,517,433, 7,654,899, 7,452,276, and 8,591,330 are incorporated herein by reference in their entireties.

The presentation devices 18, 20, the audio speakers 22, lighting assemblies, and/or other devices associated with presentation are collectively referred to as a "presentation assembly" of the gaming machine 10. The presentation assembly may include one presentation device (e.g., the primary presentation device 18), some of the presentation devices of the gaming machine 10, or all of the presentation devices of the gaming machine 10. The presentation assembly may be configured to present a unified presentation sequence formed by visual, audio, tactile, and/or other suitable presentation means, or the devices of the presentation assembly may be configured to present respective presentation sequences or respective information.

The presentation assembly, and more particularly the primary presentation device 18 and/or the secondary presentation device 20, variously presents information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 may include a touch screen(s) 24 mounted over the primary or secondary presentation devices, buttons 26 on a button panel, a bill/ticket acceptor 28, a card reader/writer 30, a ticket dispenser 32, and player-accessible ports (e.g., audio output jack for headphones, video headset jack. USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 200 (see FIG. 4). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 200 (see FIG. 4), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
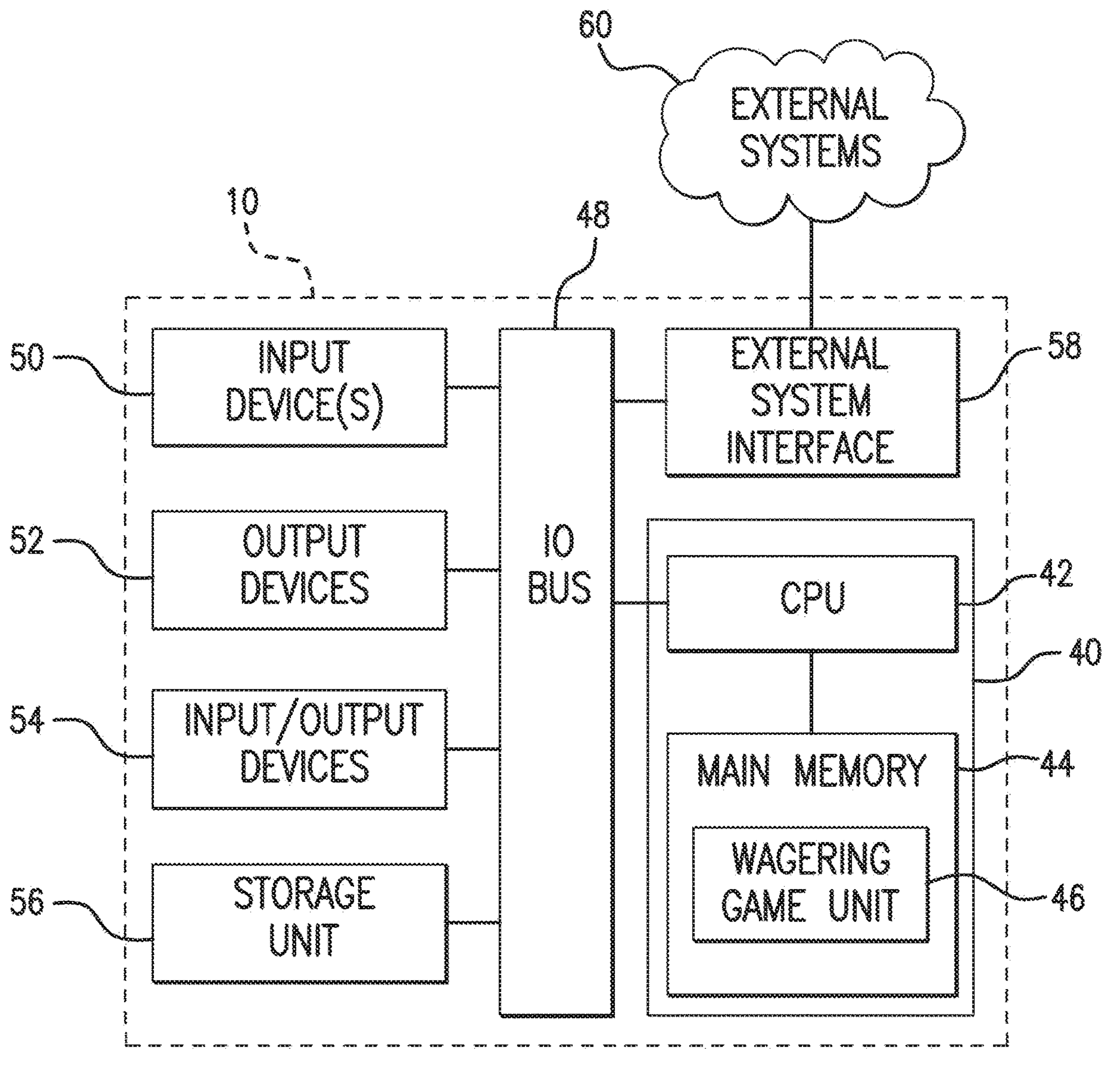
FIG. 2 is a block diagram of a gaming system according to an embodiment of the present invention.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accordance with various methods of conducting a wagering game on a gaming system in accord with the present concepts, the wagering game includes a game sequence in which a player makes a wager, and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary presentation device 18 or secondary presentation device 20) through the presentation of information such as, but not limited to, text, graphics, static images, moving images, etc., or any combination thereof. In accord with the method of conducting the wagering game, the game-logic circuitry 40 transforms a physical player input, such as a player's pressing of a "Spin" touch key or button, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary presentation device 18, other presentation device, or other output device (e.g., speakers, lights, communication device, etc.) to change from a first state to at least a second state, wherein the second state of the primary presentation device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in or are used in other gaming jurisdictions, including for example GLI Standard #11 of Gaming Laboratories International (which defines a gaming device in Section 1.5) and N.J.S.A 5:12-23, 5:12-45, and all other relevant provisions of the New Jersey Casino Control Act. As can be seen from the description herein, the gaming machine 10 may be regulatorily approved and thus implemented with hardware and software architectures, circuitry, and other special features that differentiate it from general-purpose computers (e.g., desktop PCs, laptops, and tablets).

Figure 3A:
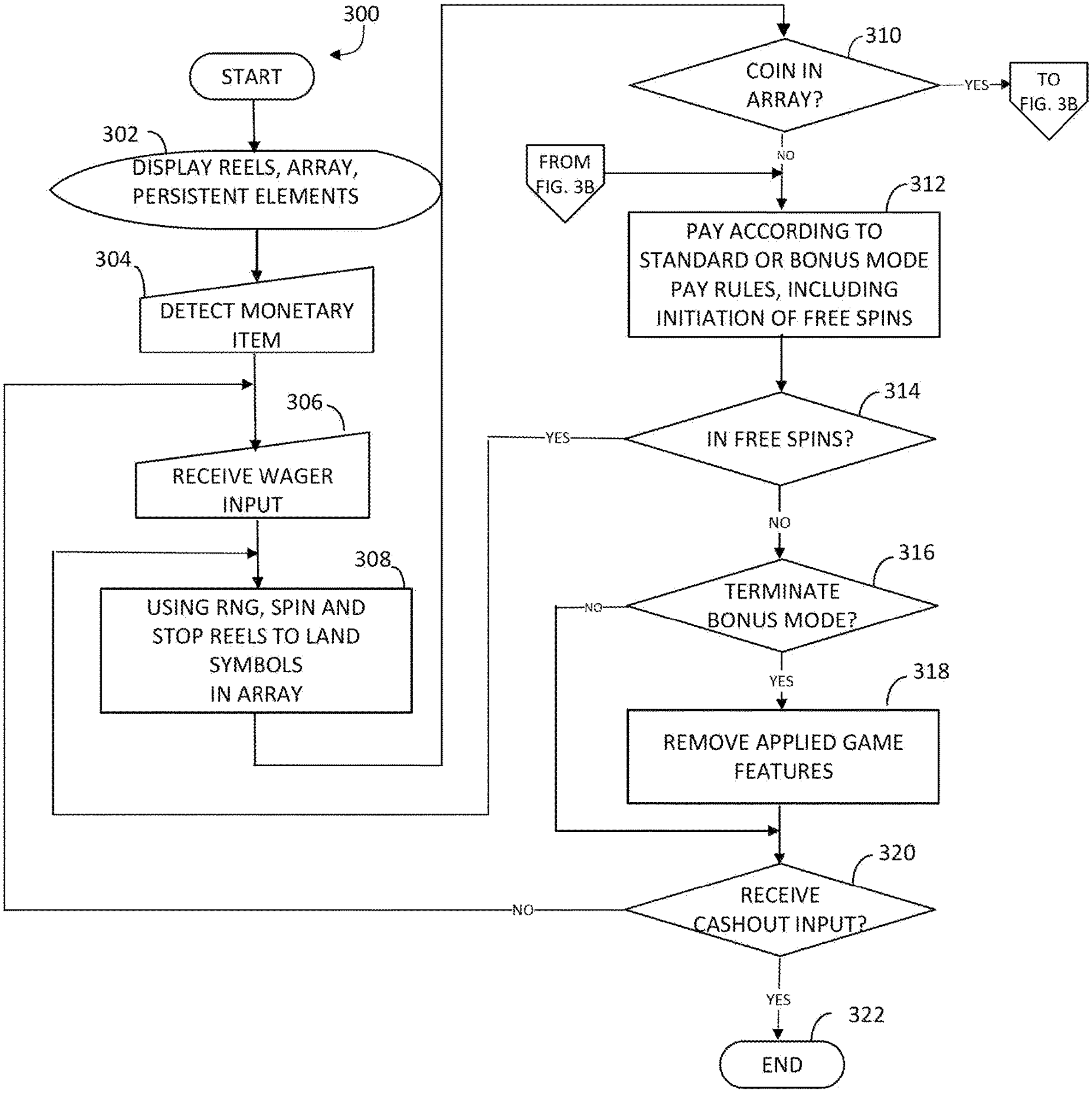
FIGS. 3A and 3B are a flow diagram for a data processing method that corresponds to instructions executed by a controller, according to an embodiment of the present invention.
Figure 3B:
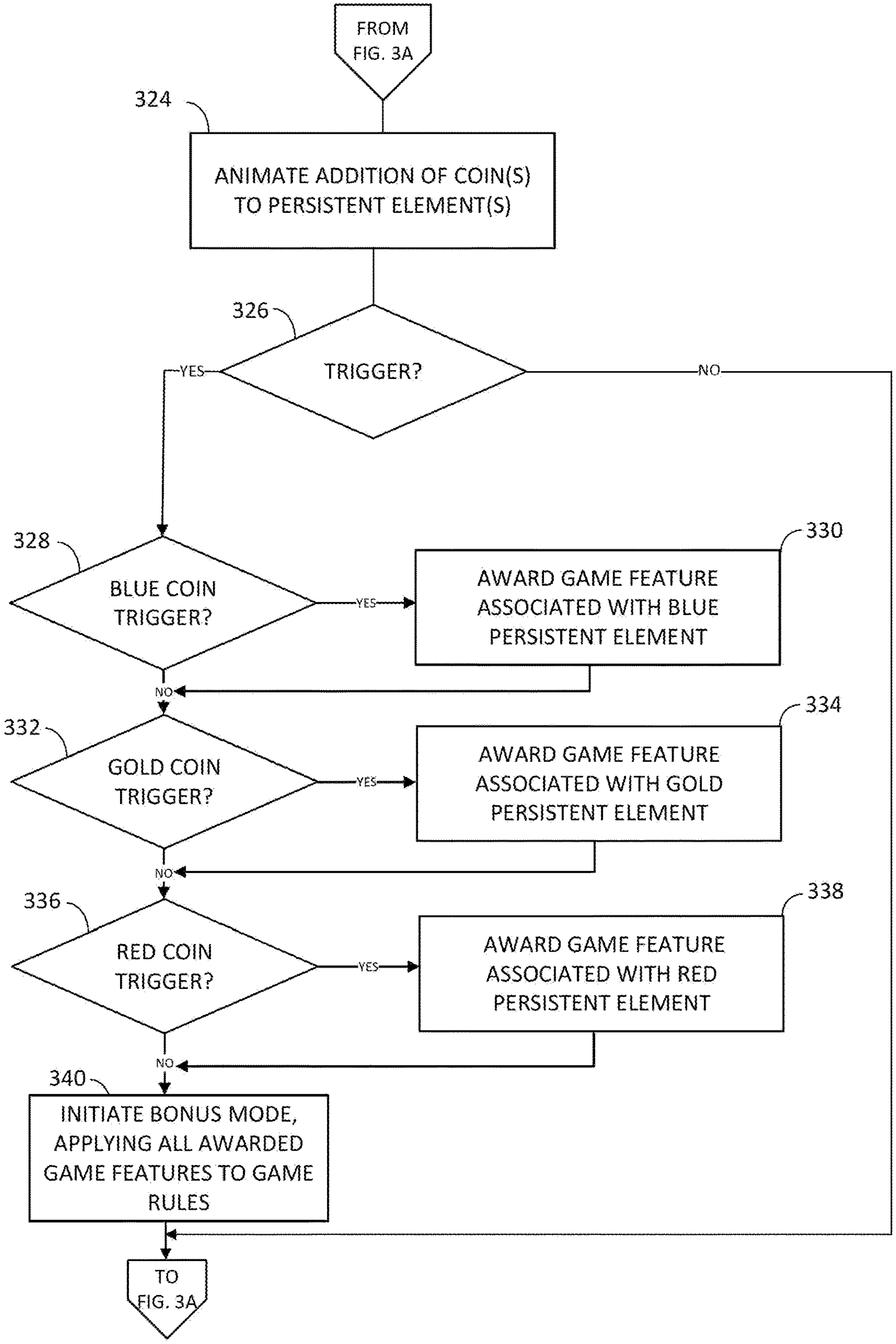

Referring now to FIGS. 3A-3B, there is shown a flow diagram representing one data processing method corresponding to at least some instructions stored and executed by the game-logic circuitry 40 in FIG. 2 to perform operations according to an embodiment of the present invention.

The data processing method is described below in connection with the exemplary presentations of different spin outcomes in FIGS. 4-10.

Game Play Initiation

Referring to FIG. 3A, the data processing method commences at step 300. At step 302, the game-logic circuitry controls one or more presentation devices (e.g., mechanical-reel display device, video display device, or a combination thereof) to present a plurality of symbol-bearing reels, an array of symbol positions, and a plurality of persistent elements. Although the method is described with respect to one presentation device, it is to be understood that the presentation described herein may be performed by a presentation assembly including more than one presentation device. The symbol positions of the array may be arranged in a variety of configurations, formats, or structures and may comprise a plurality of rows and columns. The rows of the array are oriented in a generally horizontal direction, and the columns of the array are oriented in a generally vertical direction. The symbol positions in each row of the array are horizontally aligned with each other, and the symbol positions in each column of the array are vertically aligned with each other. Alternatively, the symbol positions may be arranged in a honeycomb configuration with adjacent columns vertically offset from each other by one-half symbol position or adjacent rows horizontally offset from each other by one-half symbol position. The number of symbol positions in different rows and/or different columns may vary from each other. The reels may be associated with the respective columns of the array such that the reels spin vertically, and each reel populates a respective column. In another embodiment, the reels may be associated with the respective rows of the array such that the reels spin horizontally, and each reel populates a respective row. In some embodiments, the reels are associated with respective individual symbol positions of the array such that each reel animates in place and populates only its respective symbol position. The symbol array configuration may vary between the base game and any bonus games utilizing the array.

Figure 4:
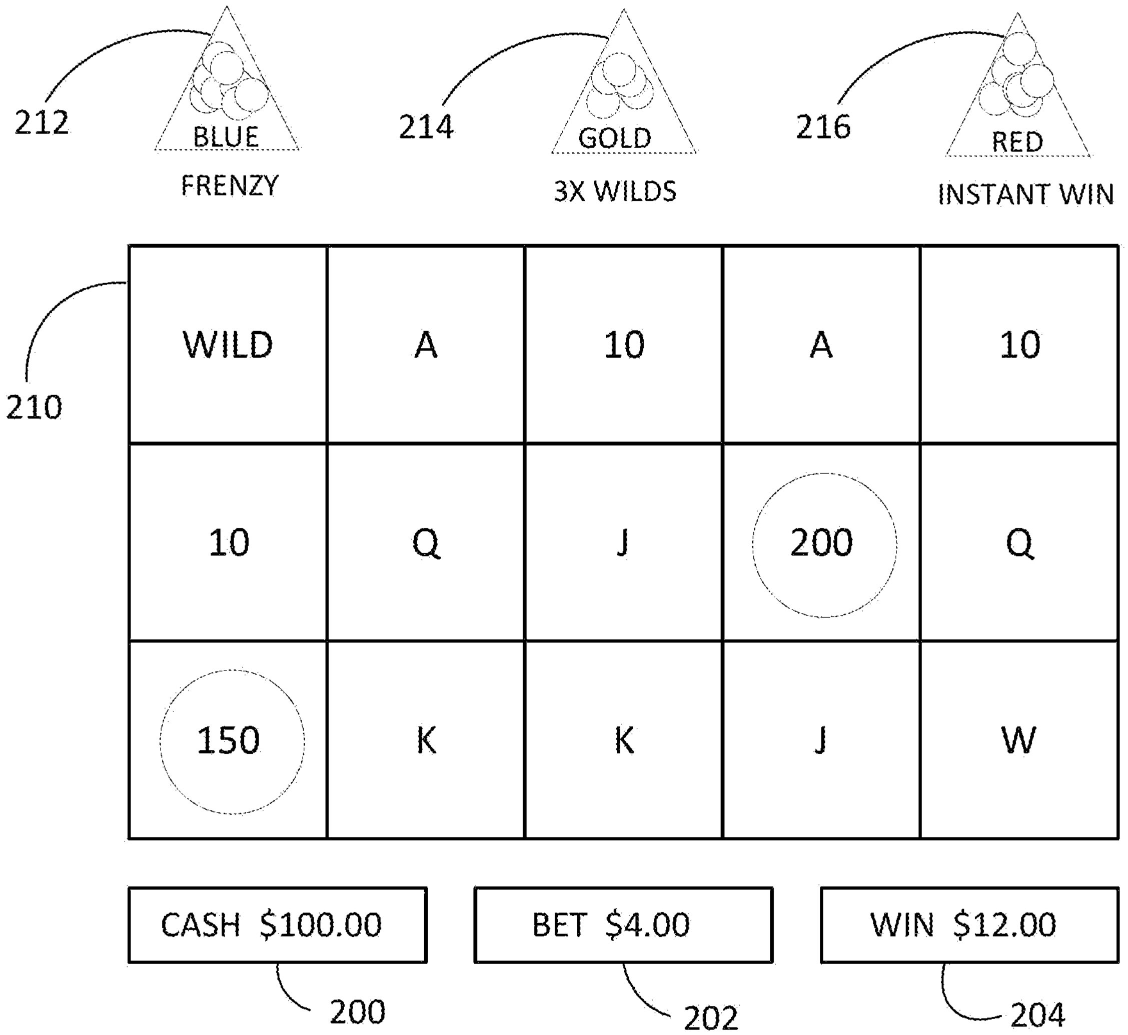
FIGS. 4-10 are exemplary presentations of game spin outcomes resulting from the flow diagram in FIGS. 3A-3B and FIGS. 11A-11B.

Referring to FIGS. 4-10, which illustrate examples of the display at the conclusion of various representative game spins, the symbol array 210 in the base game has a three-by-five rectangular configuration, and each symbol position is associated with a respective independent reel. The reels bear a plurality of symbols that may, for example, include various base game symbols 10, J, Q, K. A and a WILD symbol that can substitute for any of the base game symbols. The plurality of symbols may also include value-bearing symbols. An example of landed base game symbols and a two value-bearing symbols bearing the values 150 and 200 are shown in FIG. 4.

Figure 5:
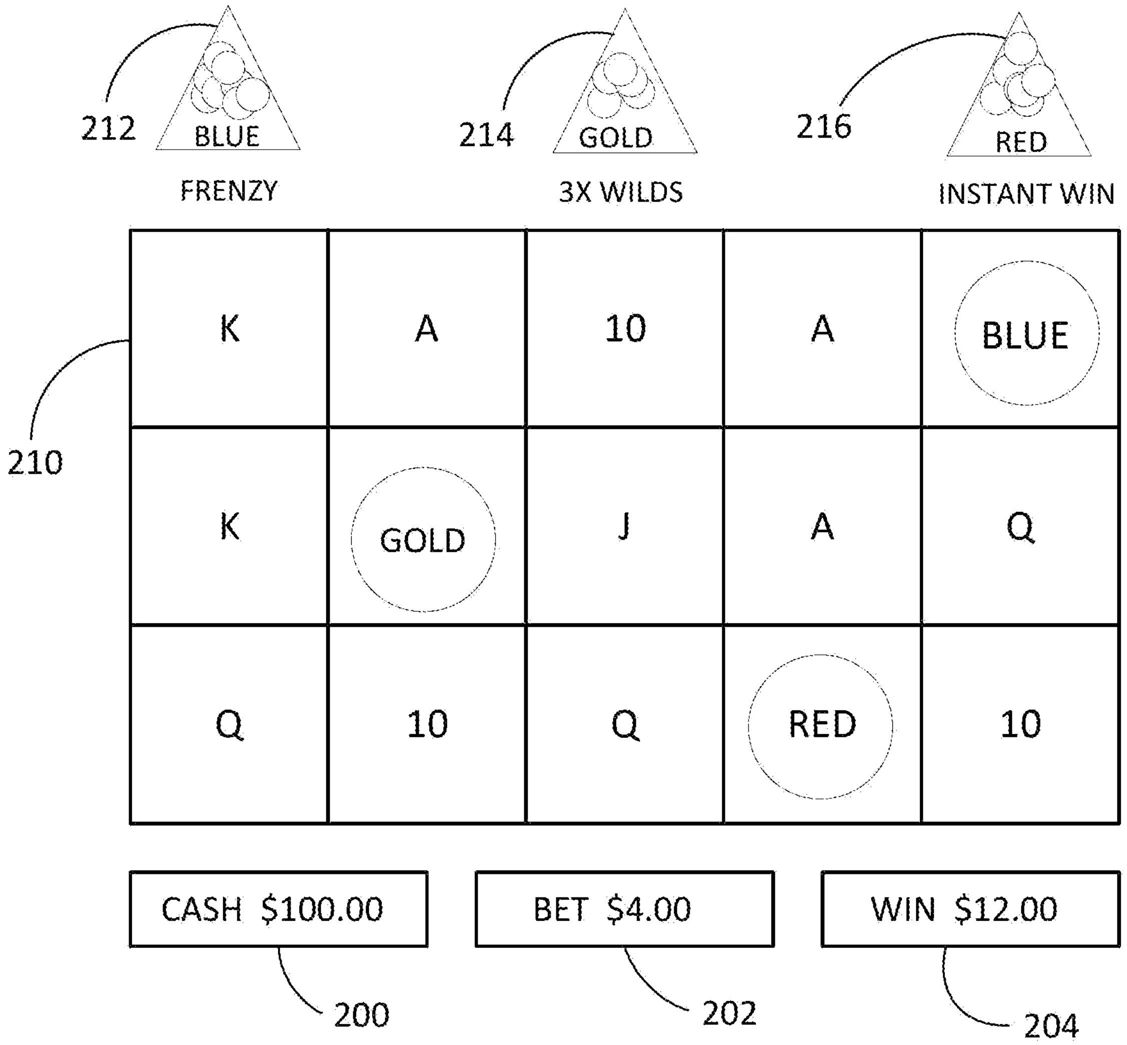

FIG. 5 illustrates that the plurality of symbols also includes accumulation symbols in the form of BLUE, GOLD and RED coin symbols. Players hope to land the BLUE, GOLD or RED coin symbols in the symbol array 210 in order to enter a bonus mode supplemented by special rules associated with three persistent elements 212, 214, 216. In the example of FIG. 5, a BLUE COIN is associated with the first persistent element 212, a GOLD coin is associated with the second persistent element 214, and a RED coin is associated with the third persistent element 216. In the examples of FIGS. 4-10, a "Frenzy" game feature is associated with the first persistent element 212, a "3× Wild" game feature is associated with the second persistent element 214, and an "Instant Win" game feature is associated with the third persistent element 216. These game features are examples. In other embodiments, different game features of various types may be associated with the persistent elements 212, 214 and 216, as will be described further below. In some embodiments, the accumulation symbols may also be value-bearing symbols. For example, a value bearing symbol, such as those illustrated in FIG. 4, may also be colored BLUE, GOLD or RED to associate it with one of the persistent elements 212, 214 and 216.

In FIGS. 4-10, the persistent elements are represented as triangles. The persistent elements 212, 214 and 216 may take forms other than triangles, including, for example, coin pots, urns, vases, jars, jugs, cans, bowls, piggy banks, beehives, inflating balloons, ladders, dials, meters, etc. Similarly, the accumulation symbols associated with the persistent elements may take forms other than coins, including, for example, balloons, colored dollar signs, etc. The accumulation symbols may or may not be color-matched to their respective persistent elements, provided their association to a persistent element is indicated. For example, the BLUE coins and the first persistent element 212 may be labeled or colored blue, the GOLD coins and the second persistent element 214 may be labeled or colored gold, and the RED coins and the third persistent element 216 may be labeled or colored red.

At step 304, the game-logic circuitry detects, via a value input device, a physical item associated with a monetary value that establishes a monetary balance in the form of cash or credits. In FIGS. 4-10, the monetary balance may be shown on a meter 200.

Game Spin

At step 306, the game-logic circuitry initiates a game of a wagering game cycle (i.e., spin cycle) in response to an input indicative of a wager covered by the monetary balance. To initiate a spin of the reels, the player may press a "Spin" or "Max Bet" key on a button panel or touch screen. In FIGS. 4-10 the wager may be shown on a bet meter 202.

At step 308, using an RNG, the game-logic circuitry spins and stops the reels to randomly land symbols from the reels in the array in visual association with one or more paylines (also known as lines, ways, patterns, or arrangements). The reel spin may be animated on a video display by depicting symbol-bearing strips moving vertically across the display and synchronously updating the symbols visible on each strip as the strip moves across the display. Alternatively, the reels may be physical/electromechanical reels. FIGS. 4-10 depict various game spin outcomes.

At step 310, the game-logic circuitry determines whether or not any accumulation (coin) symbols landed in the array 210 and, if not, proceeds to step 312, to be described later. If the game-logic circuitry determines that at least one accumulation symbol landed in the array, flow proceeds to step 324 of FIG. 3B. This example will be described first.

Animation of Persistent Element Growth

Figure 6:
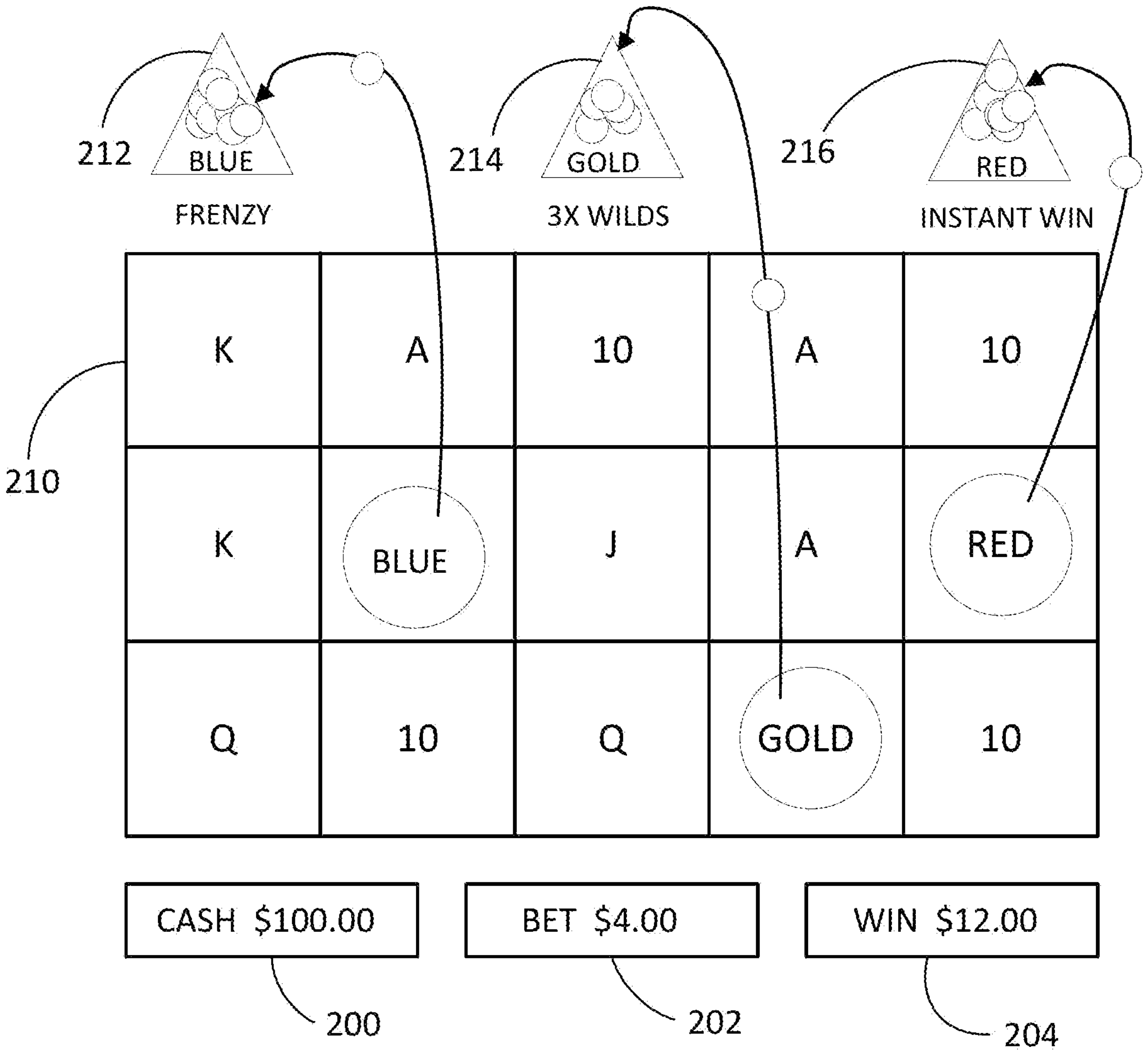

FIG. 6 illustrates the results of a game spin in which accumulation coins have landed in the array. At step 324, the game-logic circuitry animates, via the one or more presentation devices, an addition of any coin in the array to the persistent element associated with the coin. To show the transfer of a coin symbol to a persistent element, the coin may be animated to "fly" from the array to land in its associated persistent element. To represent the gradual addition of coins to the persistent element, the persistent element and/or the volume of coins therein may appear to grow in size. In accordance with some embodiments, the persistent element may be an object of fixed size accompanied by some other indication of accumulating value, for example, by a gradual change in color shading, for example, from light red to dark red. In other embodiments, the persistent element may change size and also show some other indication of increasing value, for example, the color of the display in the immediate area of the persistent element may gradually change as its value increases. The size of a persistent element may or may not indicate the likelihood that its associated game feature will be triggered. This will be discussed further below.

In one or more embodiments, the coin symbols may be carried on the reels as "stickers" applied over an underlying standard reel symbol. As part of the animation sequence at step 324, in which the coin is transferred to its respective persistent element, the coin "sticker" is removed from its location in the reel array to reveal the standard reel symbol underneath. In other embodiments, the coin symbols may simply be removed from the array and replacement symbols may be randomly selected to take their places. If the coin symbols are also value-bearing symbols, as mentioned above, the value-bearing coin symbols may remain in the array and contribute their values to the game's outcome. In other embodiments, non-value-bearing coin symbols may remain in the array as "blocking symbols" that break up other potentially winning combinations of standard symbols. These approaches or combinations thereof all fall within the spirit and scope of the invention.

In FIG. 6, each transfer of a coin to the persistent elements 212, 214, 216 is represented by a "coin" circle and an arrow. See, for example, the arrow from the BLUE coin in the second column of the array 210, the arrow from the GOLD coin in the fourth column of the array 210, and the arrow from the RED coin in the fifth column of the array 210 in FIG. 7. Though not shown in FIG. 7, no coins, coins of only one or two colors or multiple coins of the same color/type may appear in the array at the same time. Animation representing the transfer each coin from the array 210 to its respective persistent element may be presented sequentially or in parallel.

Game Feature Triggering

Figure 7:
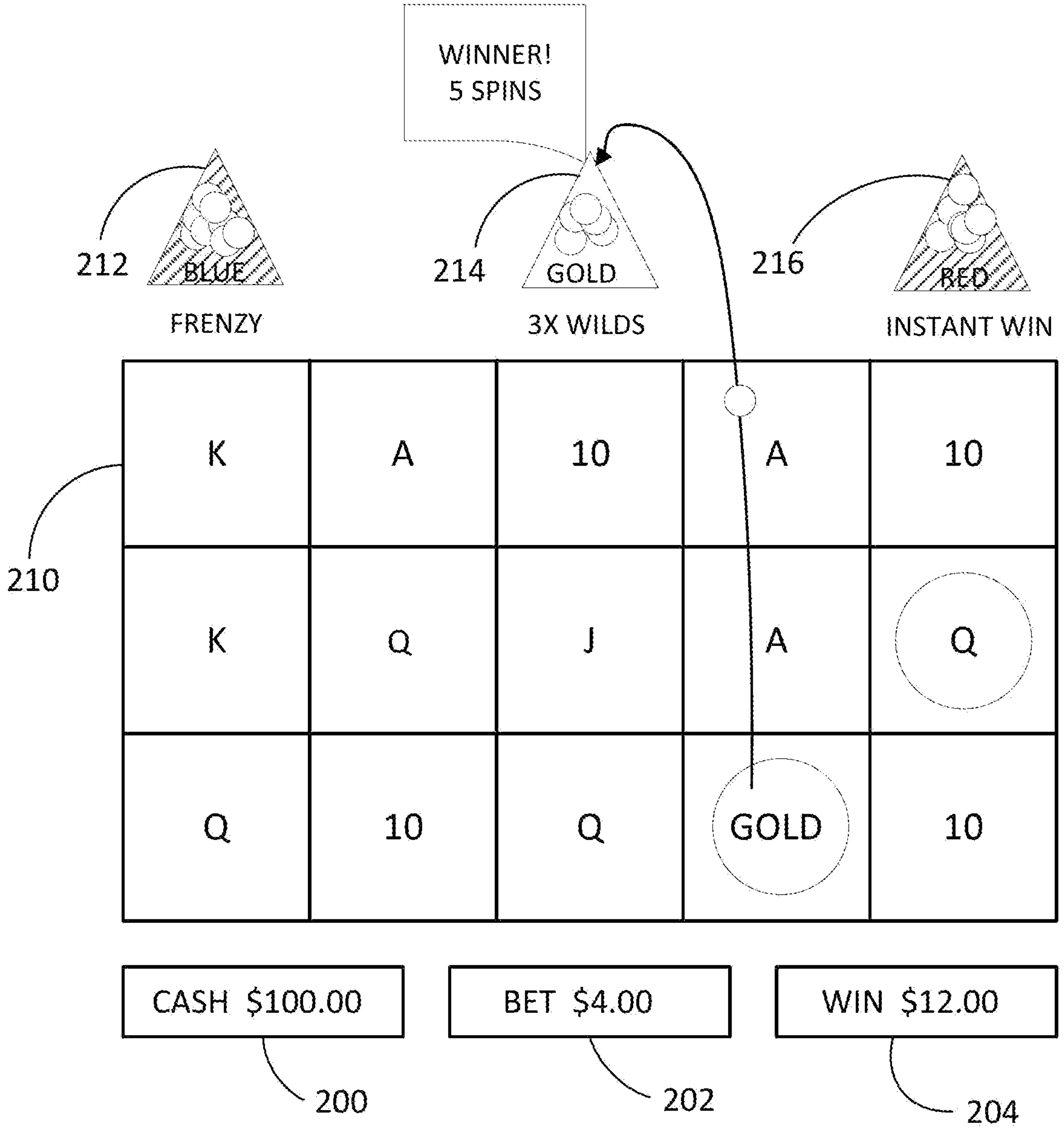

At step 326, the game-logic circuitry randomly determines, via the RNG, whether or not to trigger the game features associated with any coin symbols detected at step 310. This random determination is independent of any prior wagering game cycles. In accordance with one or more embodiments, if any coin symbols appear in the array, the odds of triggering the game features at step 326 may increase according to the number of coins appearing in the array. This may be accomplished, for example, by changing weights associated with the random determination. In other embodiments, the appearance of multiple coins in the array has no effect on the probability of awarding the game features associated with the persistent elements corresponding to the coins appearing in the array. If the game features are triggered, for each coin symbol detected at step 310, an indication such as a "WINNER!" label may appear next to each respective coin's associated persistent element, or the respective persistent element may be otherwise highlighted. Persistent elements associated with non-triggered game features may be further deemphasized, for example, by shading or "greying" them out. FIG. 7 illustrates an example of a game spin in which only the GOLD game feature has been won.

If a game feature is not triggered at step 326, the game-logic circuitry returns to FIG. 3A and proceeds to step 312, described further below. If, however, at least one game feature was triggered at step 326, the game-logic circuitry instead proceeds to step 328 to begin the process of awarding one or more game features.

In some embodiments, a "game feature" simply awards a prize, for example a fixed or progressive jackpot amount. In some embodiments, a game feature may comprise any type of bonus game. Non-limiting examples of bonus games include a certain number of free games (i.e., spins of the reels), a "pick'em" bonus game, a wheel-spinning game, etc. In still other embodiments, a bonus game may be played to determine payment of prize, for example, a fixed or progressive jackpot. In some embodiments, a game feature may comprise an enhancement to the game. An enhancement may include, without limitation, pay table modifiers such as multipliers, increased values on value-bearing symbols, modification to the reels to include improved symbols, such as wild symbols, modification of symbol weights or the removal of certain "blocking symbols", additional rows or columns added to the array, additional free spins, replacement symbols for symbols already present in the array, etc. The enhancement may be applied to the current base game outcome or may be applied to one or more subsequent bonus games or wagered base game plays, as will be shown. In some embodiments, a game feature may provide a second plurality of symbol-bearing reels and a second array of symbol positions to be filled, as described above, for a certain number of game cycles. Each game feature has a different impact on the expected value (EV) of the game. The relative frequency of the game features may be controlled by adjusting which coin pot they are associated with in the cascade sequence, for example. Thus, a less lucrative game feature may be won more frequently, for example, approximately once in every ten game spin cycles, while a higher paying game feature may only occur approximately once in every one hundred game spin cycles according to a weighted cascade value determination. This allows game features to be triggered more often, for player enjoyment, while maintaining the overall expected EV of the wagering game.

Perceived Persistence

During a player's gaming session, the growth in size of the persistent elements 212, 214 and 216 persists from one wagering game cycle to the next such that the player perceives that a game feature corresponding to a persistent element may be getting closer to being triggered. When the size of the persistent elements has no bearing on whether the associated game feature will actually be triggered, this is known as "perceived persistence." When a game feature associated with a persistent element is triggered, at least some of the contents of the persistent element are visually removed and the accumulation of value in that persistent element during subsequent game spin cycles resumes from that point. Each of the persistent elements 212, 214 and 216 exhibits perceived persistence.

At step 328, if at least one BLUE coin associated with the first persistent element 212 was present in the array at step 310, the game logic circuitry awards the game feature associated with the first persistent element 212 at step 330, otherwise the game-logic circuitry continues the flow at step 332.

In the examples shown in FIGS. 4-10, the game feature associated with the first persistent element 212 is "Frenzy." This exemplar game feature increases the value of value-bearing symbols on the reels for the duration of a bonus mode to be initiated at step 340, below, once any other game features have been awarded. The reel strip layouts may otherwise remain the same as those of the base game or may be different. Once the "Frenzy" game feature has been awarded at step 330, the game logic circuitry proceeds to step 332.

At step 332, if at least one GOLD coin associated with the second persistent element 214 was present in the array at step 310, the game logic circuitry awards the game feature associated with the second persistent element 214 at step 334, otherwise the game-logic circuitry continues the flow at step 336.

In the example shown, the game feature associated with the second persistent element 214 is "3× Wilds," in which the wilds symbols on the reels will be replaced by 3× Wild symbols for the duration of a bonus mode to be initiated at step 340, below, once any other game features have been awarded. The reel strip layouts may otherwise remain the same as those of the base game or may be different. Once the "3× Wild" game feature has been awarded at step 334, the game logic circuitry proceeds to step 336.

At step 336, if at least one RED coin associated with the third persistent element 216 was present in the array at step 310, the game logic circuitry awards the game feature associated with the third persistent element 216 at step 338, otherwise the game-logic circuitry continues the flow at step 340.

In the example shown, the game feature associated with the third persistent element 216 is an "Instant Win" game feature, in which a special "catalyst" symbol is added to one or more of the reels for the duration of a bonus mode to be initiated at step 340, below. When the catalyst symbol lands in the array 210, the values on any value-bearing symbols in the array 210 are awarded. This is advantageous to the player because, unless a certain number of value-bearing symbols appear in the array 210, for example, six, the values on the symbols are not awarded. When less than the required number of value-bearing symbols are present, they tend to serve a "blocking symbols," breaking up other potential winning combinations. The reel strip layouts may otherwise remain the same as those of the base game or may be different. Once the game feature has been awarded at step 338, the game logic circuitry proceeds to step 340.

Applying Game Features/Bonus Mode Initiation

At step 340, once all of the eligible game features have been awarded at one or more of steps 330, 334 and 338, if not already in a bonus mode, the game is placed in a bonus mode for a certain number of spins, determined via the RNG. In some embodiments, the number of spins is predetermined, for example, five spins. A bonus mode spin counter 220 associated with the bonus mode may be initialized and displayed, (FIG. 9) The bonus mode spin counter will later be modified and tested at step 316, described below. The bonus mode games will be played according to game rules and conditions set by the one or more awarded game features, enhancing the excitement and EV of the bonus mode games. For example, if only the "Frenzy" game feature was awarded at step 330, the reels will have enhanced value-bearing symbols for the duration of the bonus games. Likewise, if only the "3× Wild" was awarded at step 334, the reels will be modified with 3× Wild symbols for the duration of the bonus mode games. Finally, if only the "Instant Win" game feature was awarded at step 338, the reels will be enhanced with one or more catalyst symbols for the duration of the bonus mode. It should be noted that multiple game features may be awarded if the spin that triggered the awarding of game features and the initiation of the bonus mode resulted in coins of more than one color appearing simultaneously in the array 210. In the case where all three game features have been awarded, the reels will be enhanced by increasing the values of the value-bearing symbols, Wild symbols will become 3× Wild symbols and one or more catalyst symbols will also be added to one or more reels.

In the exemplar embodiment, once the bonus mode is initialized at step 340, the coin symbols will be removed from the reel strips for the duration of the bonus mode. At the conclusion of the bonus mode, any pay rule or game modifications will be reset to the standard base game configuration at step 318, described below. The game logic circuitry then returns to FIG. 3A, proceeding to step 312.

Win Evaluation

Figure 8:
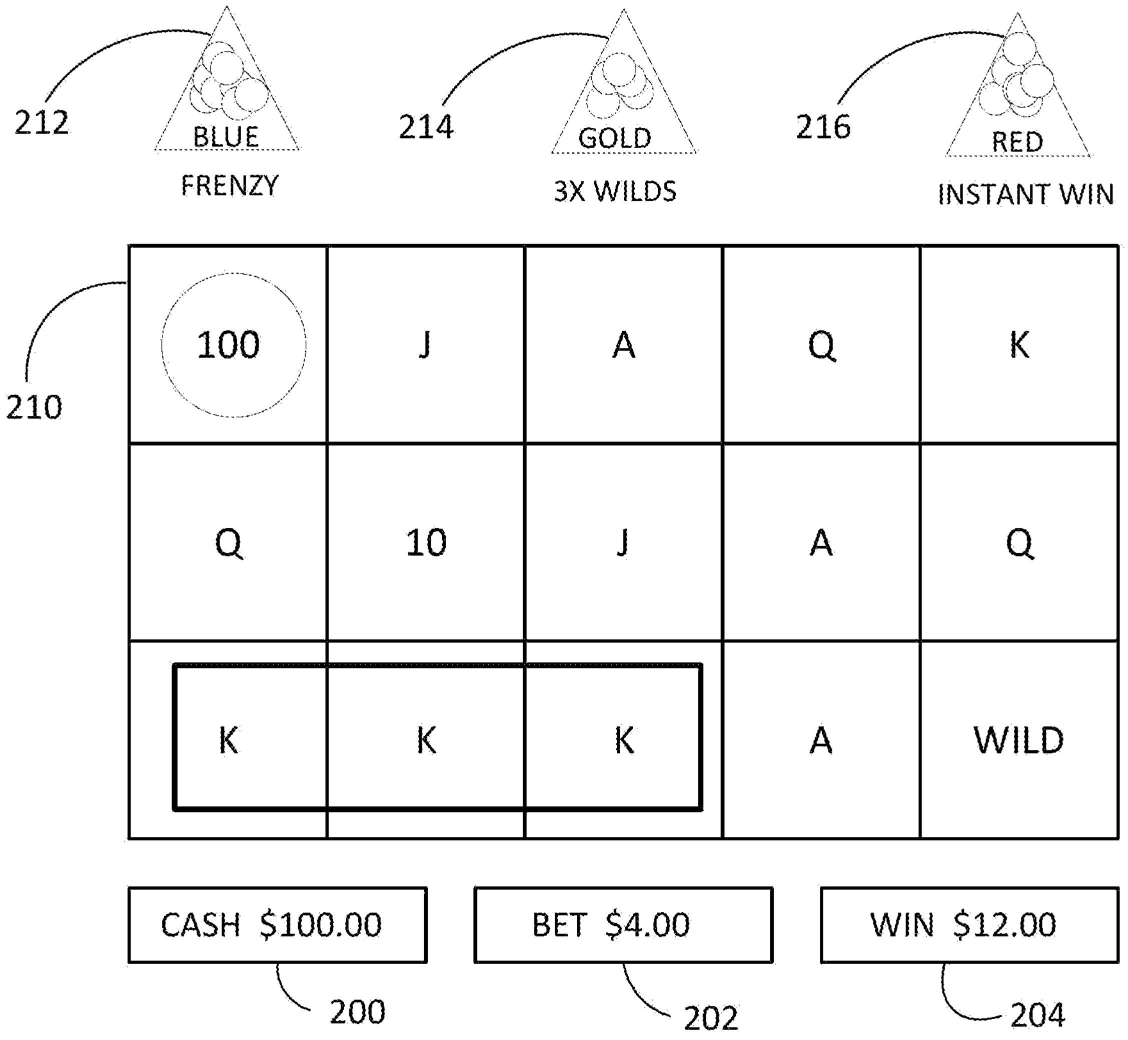

Once any animation of persistent element growth has occurred, any game features have been awarded and any bonus mode initiated, the game-logic circuitry evaluates the symbols in the array at step 312. Payouts are awarded in accordance with either base game pay rules or bonus mode game rules, depending on whether the bonus mode is in effect for the current spin. The pay rules may include a pay table. The pay table may, for example, include "line pays," "ways pays" and "scatter pays." Line pays occur when a predetermined type and number of symbols appear along an activated payline, typically in a particular order such as left to right, right to left, top to bottom, bottom to top, etc. Ways pays appear on adjacent reels without the requirement to be on a specified pay line or directly adjacent to one another. Scatter pays occur when a predetermined type and number of symbols appear anywhere in the displayed array without regard to position or paylines. Each payline preferably consists of a single symbol position in each column of the array. The number of paylines may be as few as one or as many as possible given each payline consists of a single symbol position in each column of the array. To animate a standard pay, the display may apply a border, pattern, color change, background change, watermark, or other distinguishing characteristic to the winning payline and/or winning symbols that contributed to the pay. FIG. 8, for example, depicts a line pay of three K symbols in the bottom row of the array 210. The awarded pay is added to a win meter 204.

Figure 10:
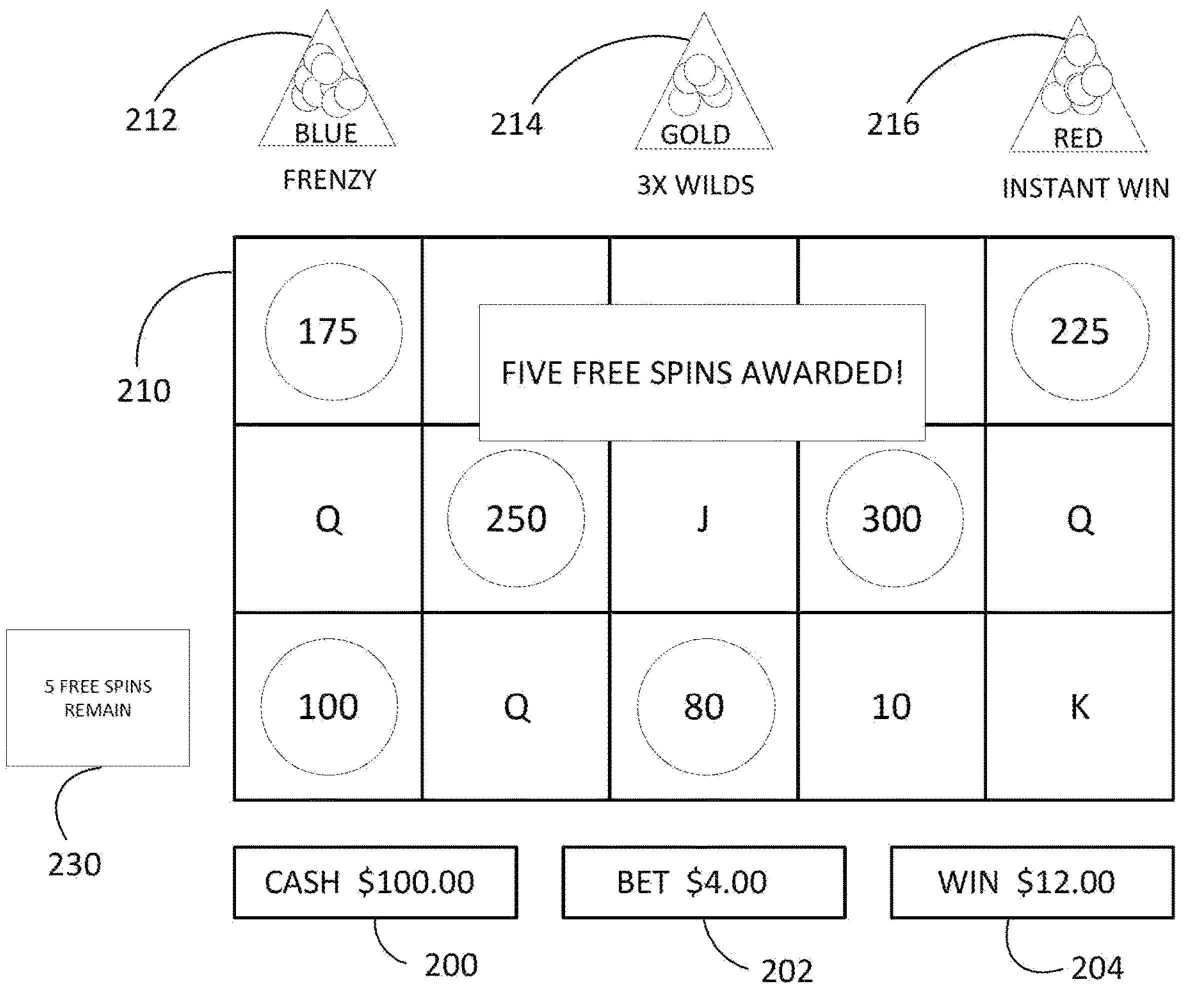

The pay rules may include the awarding of one or more free spins. In one example, a certain number of free spins, for example, five free spins, may be awarded by the game rules if six or more value-bearing symbols land in the array 210. FIG. 10, described further below, illustrates an example of a game outcome that triggers free spins. In some embodiments, the number of free spins is predetermined. In other embodiments, the number of free spins may be randomly determined and vary between each awarding of free spins. The free spins may be played as a "hold and spin" game in which certain types of symbols, once landed in the array, are held in place and may variously persist in the array for at least one additional free spin cycle, until they contribute to a winning outcome, until all of the free spins have been played, etc. These persistent symbols typically include value-bearing symbols, which may or may not be awarded until a certain number of the value-bearing symbols have been held in the array. In some embodiments, wild symbols or other symbols that may improve the chances of winning or provide higher pays may also be held.

At step 314, the game-logic circuitry checks to see whether the game is in a free spin state as a result of free games having been previously awarded at step 312. If the game is in a free game state, the game logic circuitry returns to step 308 for another spin without requiring a wager.

Bonus Mode Termination

If the game in not in a free game state, that is, if the free spin counter 230 is, for example, zero, the game-logic circuitry advances to step 316 to check whether any bonus mode in effect should be canceled. As part of this evaluation, step 316 may modify the bonus mode spin counter 220 (FIG. 9), for example, by subtracting one from the number of remaining bonus mode spins prior to testing for bonus mode termination. If bonus mode termination is required, at step 318, the game-logic circuitry removes all game rules previously applied at step 340 and the bonus mode counter 220 is removed.

Game Play Continuation/Termination

At step 320, the game-logic circuitry determines whether or not it has received a cashout input via at least one of the one or more player input devices of the gaming machine. If it has not received a cashout input, the game-logic circuitry waits for the next wager input at step 306. If it has received a cashout input, the game-logic circuitry initiates a payout from the monetary balance on the meter 200 in FIGS. 4-10. The data processing method then ends at step 322.

Examples of Spins Related to Method 300

Figure 9:
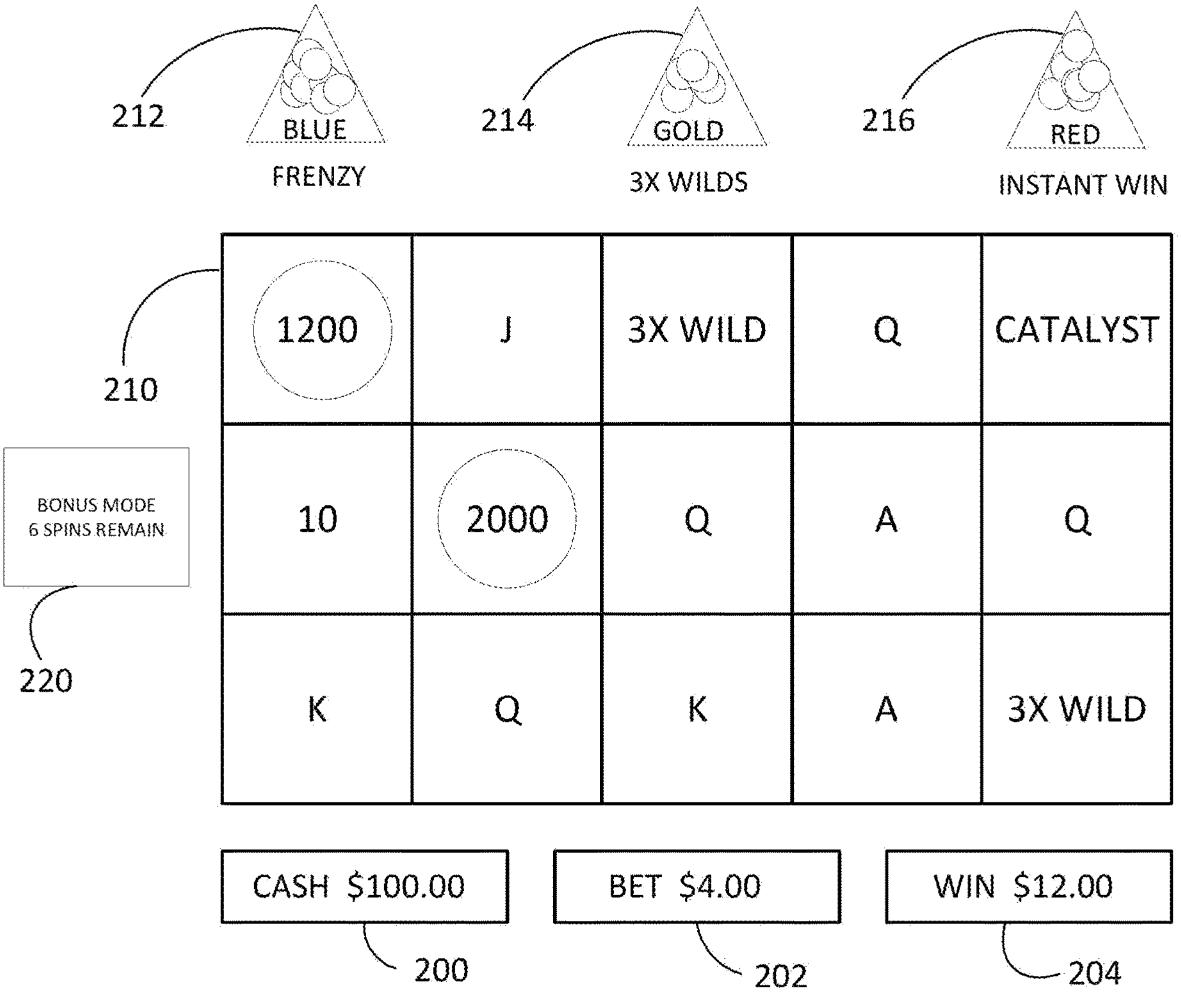

In accordance with one or more embodiments, FIG. 9 illustrates an example of the conclusion of a game spin while in the bonus mode with the "Frenzy," "3× Wilds" and "Instant Win" game features in effect. Because the "Frenzy" game feature is in effect, the value-bearing symbols bear larger values, 1200 and 2000, compared to the value bearing symbols shown in FIGS. 4 and 6. Because the "3× Wilds" game feature is in effect, the wild symbols bear 3× multipliers. Finally, a catalyst symbol appears in the array as a result of the "Instant Win" game feature being in effect. While the 3× Wild symbols do not create any winning combinations with the other symbols in the array, the game will award 3200 credits (1200+2000) for the "Instant Win" game feature when wins are evaluated at step 312.

In accordance with one or more embodiments, FIG. 10 illustrates an example of the conclusion of a game spin that triggers free games. In this example, six value-bearing symbols appear in the array, which, according to the exemplar game rules described above, awards five free spins at step 312. The number of free spins remaining is reflected in a free spin meter 230. Note that none, one, two or three of the game features may also be in effect during the free games, depending on whether the game is already in the bonus mode or not. In the example of FIG. 10, the game is not in a bonus mode, thus the bonus mode spin counter 220 (FIG. 9) is not displayed.

Figure 11A:
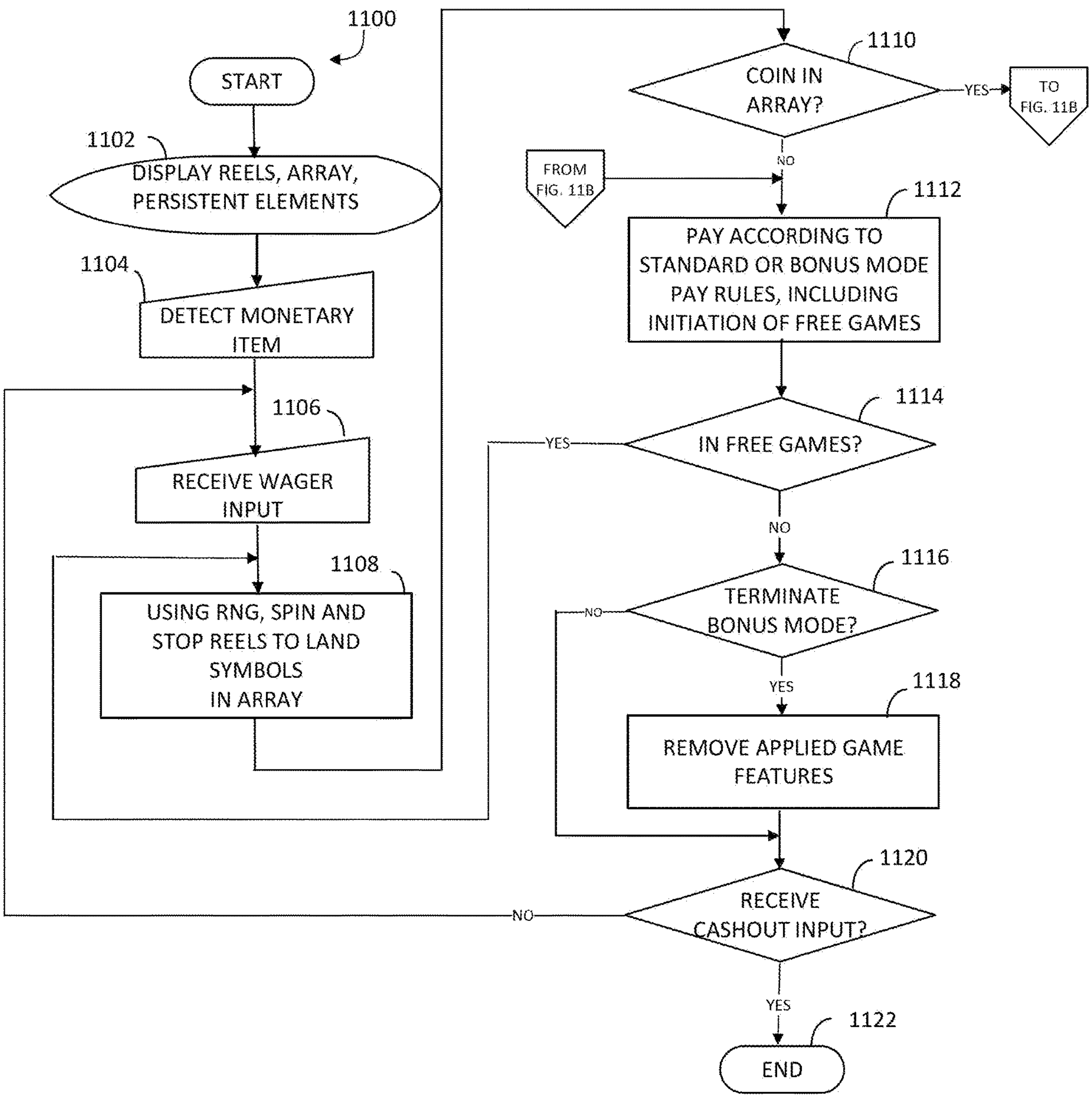
FIGS. 11A and 11B are a flow diagram for a data processing method that corresponds to instructions executed by a controller, according to an alternate embodiment of the present invention.
Figure 11B:
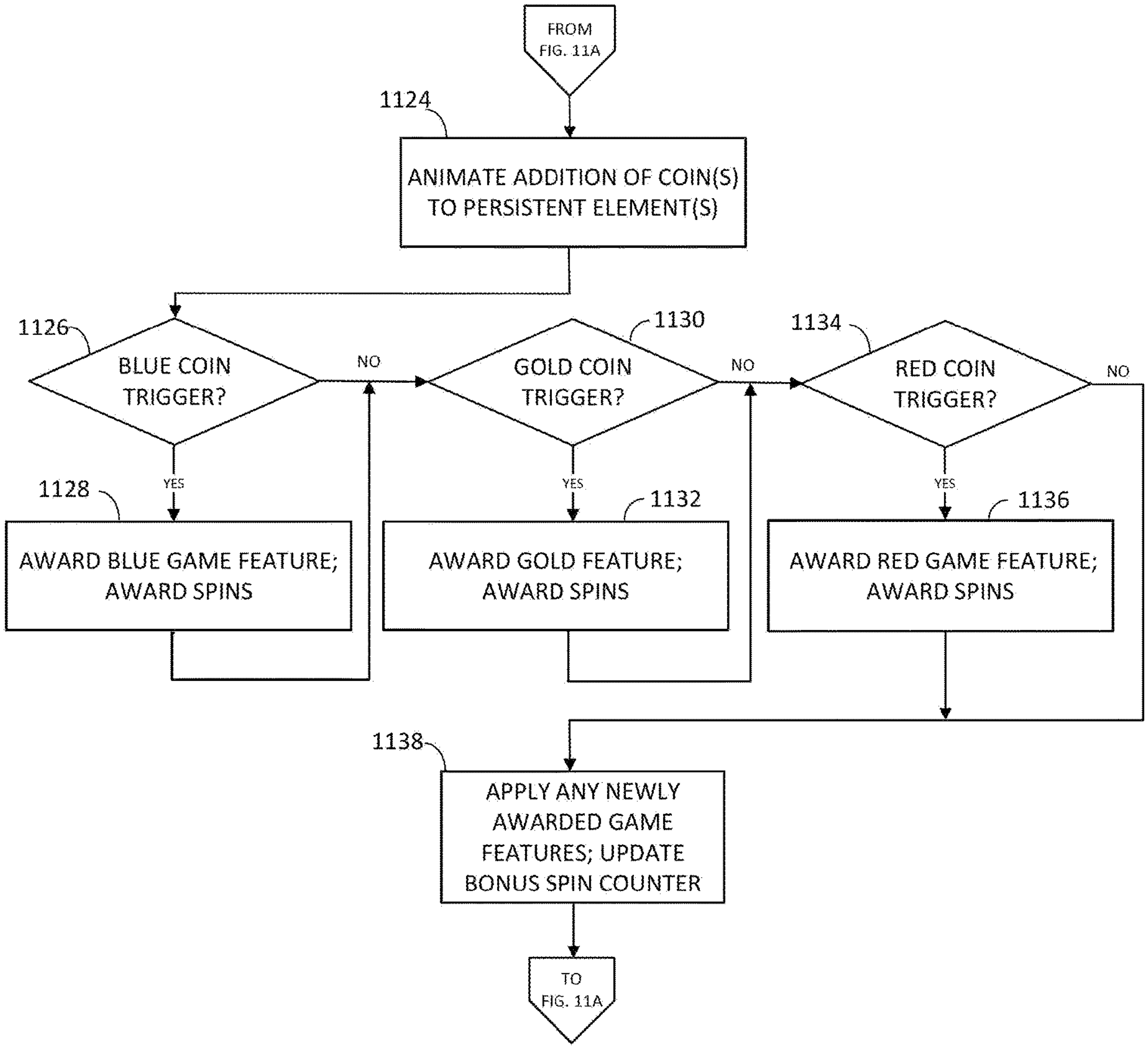

Referring now to FIGS. 11A-11B, there is shown a flow diagram representing a second data processing method corresponding to at least some instructions stored and executed by the game-logic circuitry 40 in FIG. 2 to perform operations according to an embodiment of the present invention. The data processing method is also described in connection with the exemplary presentations of different spin outcomes in FIGS. 4-10.

Game Play Initiation

Referring to FIG. 11A, the data processing method commences at step 1100. At step 1102, the game-logic circuitry controls one or more presentation devices (e.g., mechanical-reel display device, video display device, or a combination thereof) to present a plurality of symbol-bearing reels, an array of symbol positions, and a plurality of persistent elements as described above with respect to step 302.

At step 1104, the game-logic circuitry detects, via a value input device, a physical item associated with a monetary value that establishes a monetary balance in the form of cash or credits as described above with respect to step 304.

Game Spin

At step 1106, the game-logic circuitry initiates a game of a wagering game cycle (i.e., spin cycle) in response to an input indicative of a wager covered by the monetary balance as described above with respect to step 306.

At step 1108, using an RNG, the game-logic circuitry spins and stops the reels to randomly land symbols from the reels in the array as described above with respect to step 308.

At step 1110, the game-logic circuitry determines whether or not any accumulation (coin) symbols landed in the array 210 and, if not, proceeds to step 1112, to be described later. If the game-logic circuitry determines that at least one accumulation symbol landed in the array, flow proceeds to step 1124 of FIG. 11B. This example will be described first.

Animation of Persistent Element Growth

At step 1124, the game-logic circuitry animates, via the one or more presentation devices, an addition of any coin in the array to the persistent element associated with the coin as described above with respect to step 324.

Game Feature Triggering

At step 1126, the game-logic circuitry randomly determines, via the RNG, whether or not to award the game feature associated with any BLUE coin symbols in array 210. Unlike the previously described embodiment in which a single decision is made to award all game features having an associated coin in array 210 (at step 326), this embodiment independently determines whether to award only the game feature associated with the BLUE coin at step 1126.

If the decision is made to not award the BLUE game feature, flow proceeds to step 1130, otherwise, the associated game feature is awarded at step 1128 in the manner described with respect to step 330, above. In addition, if the game is not currently in a bonus mode, the game is placed in a bonus mode for a certain number of spins, randomly determined via the RNG. In some embodiments, the number of spins is predetermined; for example, five spins. As described above, a spin counter 220 associated with the bonus mode may be initialized and displayed (FIG. 9). This spin counter will be modified and tested at step 1116, described below.

If the game is already in the bonus mode, the bonus mode is extended by the number of spins determined at step 1128 and the spin counter 220 is increased by the new number of spins. Thus, awarding of the BLUE persistent element either initiates a new bonus mode or extends an existing bonus mode with the addition of the BLUE game feature, in this case, the "Frenzy" rules, applied to the game rules currently in effect.

At step 1130, the game-logic circuitry randomly determines, via the RNG, whether or not to award the game feature associated with any GOLD coin symbols in array 210. Again, the game-logic circuitry independently determines whether or not to award the game feature associated with the GOLD persistent element at this step.

If the decision is made to not award the GOLD game feature, flow proceeds to step 1134, otherwise, the associated game feature is awarded at step 1132 in the manner described with respect to step 334, above. As above, if the game is not currently in a bonus mode, the game is placed in a bonus mode for a certain number of spins, as described above with respect to step 1128. As described above, the bonus mode counter 220 may be initialized and displayed (FIG. 9). This spin counter will be modified and tested at step 1116, described below.

If the game is already in the bonus mode, the bonus mode is extended by the number of spins determined at step 1132 and the bonus mode counter 220 is increased by the new number of spins. Whether the awarding of the GOLD persistent element initiates a new bonus mode or extends an existing bonus mode, the "3× Wilds" GOLD game feature rules will be applied to the game rules currently in effect.

At step 1134, the game-logic circuitry randomly determines, via the RNG, whether or not to award the game feature associated with any RED coin symbols in array 210. At this step, the game independently determines whether to award only the game feature associated with the RED persistent element. If the decision is made to not award the RED game feature, flow proceeds to step 1138, otherwise, the associated game feature is awarded at step 1136 in the manner described with respect to step 338, above.

Once again, if the game is not currently in a bonus mode, the game is placed in a bonus mode for a certain number of spins, as described above with respect to step 1128. Also as described above, the bonus mode counter 220 may be initialized and displayed (FIG. 9). This spin counter will be modified and tested at step 1116, described below.

If the game is already in a bonus mode, the bonus mode is extended by the number of spins determined at step 1136 and the bonus mode counter 220 is increased by the new number of spins. Whether the awarding of the RED persistent element initiates a new bonus mode or extends an existing bonus mode with the addition of the RED game feature, the "Instant Win" rules will be applied to the game rules currently in effect.

Applying Game Features/Bonus Mode Initiation/Extension

At step 1138, any newly awarded game features from steps 1128, 1132 or 1136 are applied to the current game rules in effect as described with respect to step 330, above. Thus, the bonus mode games will be played according to game rules and conditions set by previously awarded game features enhanced by any newly awarded game features. Multiple game features may be in effect at the same time, as described above with reference to step 340.

If multiple game features were newly awarded in steps 1126, 1130 or 1134, each additional extension will be applied to the bonus mode counter 220. The spin counter 220 will reflect the cumulative effect of the previous value of the bonus mode counter 220 plus any newly awarded spins. For example, if the bonus mode counter 220 value was 0 at the step 1138 (signifying that no bonus mode was in effect) and 4 spins were awarded at step 1126, 6 spins awarded at step 1130, and 4 spins awarded at step 1134, the bonus mode counter 220 would be initialized to reflect 14 (4+6+4) bonus mode spins and the bonus mode would be initialized accordingly.

In another example, if a bonus mode was already in effect from a previous game cycle and the bonus mode counter value was 7, 4 additional spins awarded at step 1126 would set the bonus mode counter 220 to 11 (7+4).

Once any newly awarded game features have been applied to the game rules and any updates to the bonus game spin counter 220 have been applied at step 1138, the game-logic circuitry returns to FIG. 11A and proceeds to step 1112.

Win Evaluation

Once any animation of persistent element growth has occurred, any game features have been awarded and any bonus mode initiated or extended, the game-logic circuitry evaluates the symbols in the array at step 1112 as described above with reference to step 312.

At step 1114, the game-logic circuitry checks to see whether the game is in a free spin state as a result of free spins having been previously awarded at step 1112. If the game is in a free spin state, the game logic circuitry returns to step 1108 for another spin without requiring a wager.

Bonus Mode Termination

If the game in not in a free spin state, the game-logic circuitry advances to step 1116 to check whether any bonus mode should be canceled, as described above with reference to step 316. If a bonus mode should be canceled, at step 1118, all game rules previously applied at step 1138 are removed and the bonus mode counter 220 is removed.

Game Play Continuation/Termination

At step 1120, the game-logic circuitry determines whether or not it has received a cashout input via at least one of the one or more player input devices of the gaming machine. If it has not received a cashout input, the game-logic circuitry waits for the next wager input at step 1106. If it has received a cashout input, the game-logic circuitry initiates a payout from the monetary balance on the meter 200 in FIGS. 4-10. The data processing method then ends at step 1122.

Examples of Spins Related to Method 1100

Spin 1: In one example of a series of spins illustrating the concepts covered by method 1100, a credit balance is established, and a wager is accepted to initiate a first spin. The game is in a base game state with no free games and is not in bonus mode.

The first spin results in no winning paytable outcomes, no awarding of free games and no awarding of game features. Another wager is accepted to initiate the next spin.

Spin 2: The second spin results in a winning paytable outcome only, which is awarded. FIG. 8 provides an example of such an outcome. Another wager is accepted to initiate the next spin.

Spin 3: The third spin, like the first, provides no winning outcomes. Another wager is accepted to initiate the next spin.

Spin 4: The fourth spin lands six value-bearing symbols in the array. The values on the value-bearing symbols are awarded and, according to the rules of the game, five free spins are also awarded and the free spin counter 230 is set to 5. FIG. 10 provides an example of such an outcome. No wager is required for the next spin because free spins have been awarded.

Spin 5: The fifth spin, like the first and third spins, produces no winning outcomes. The free spin counter 230 is decremented to 4. Free games remain, thus, no wager is required for the next spin.

Spin 6: A GOLD coin lands in the array on the sixth spin. The GOLD game feature is awarded and all wild symbols on the reels become 3× Wild symbols. Bonus mode is initiated and will be in effect for five spins. The bonus mode counter 220 is displayed and set to 5. FIG. 9 provides an example of such an outcome. The free spin counter 230 is decremented to 3. Because free games remain, no wager is required for the next spin.

Spin 7: The seventh spin results in a line pay win that includes a 3× Wild and the normal pay value is multiplied by three and awarded. The bonus mode counter 220 is decremented to 4, the free spin counter 230 is decremented to 2 and no wager is required for the next spin.

Spin 8: The eighth spin results in no winning outcomes. The bonus mode counter 220 is decremented to 3, the free spin counter 230 is decremented to 1 and no wager is required for the next spin.

Spin 9: The ninth spin results in no winning outcomes, though a BLUE, a GOLD and a RED coin all appear in the array. FIG. 6 provides an example of an outcome where coins land in the array and affect the size of their associated persistent elements without triggering the awarding of any game features. The bonus mode counter is decremented to 2 and the free spin counter is decremented to 0 and removed from the display. Because no free spins remain, a wager is required for the next spin. Even though the free spin period is complete, the 3× Wild symbols remain in effect for an additional two spins, paid or otherwise.

Spin 10: A BLUE coin lands in the array on the tenth spin. Awarding of the BLUE game feature ("Frenzy") is triggered and the values borne by all value-bearing symbols on the reels are increased. Bonus mode is extended by two spins and the bonus mode counter 220 is increased to 4. At this time, both the GOLD and the BLUE game features are applied to the game rules. Because no free spins are in effect, a wager is required for the next spin and is accepted.

Spin 11: The eleventh spin results in no winning outcomes. The bonus mode counter 220 is decremented to 3. A wager is required for the next spin and is accepted.

Spin 12: A RED coin lands in the array on the twelfth spin. Awarding of the RED game feature ("Instant Win") is triggered and the catalyst symbol is added to one or more reels, as described above. Bonus mode is extended by two spins and the bonus mode counter 220 is increased to 4. At this time, both the GOLD and the BLUE game features are applied to the game rules. Because no free spins are in effect, a wager is required for the next spin and is accepted.

Spin 13: On the thirteenth spin, two value-bearing symbols appear in the array along with the catalyst symbol. Because the "Instant Win" game feature is in effect, the values borne by the value-bearing symbols are awarded. For example, if the value-bearing symbols bore 1200 and 2000, as shown in FIG. 9, 3200 credits would be awarded. The bonus mode counter is decremented to 3. A wager is required for the next spin and is accepted.

Spin 14: The fourteenth spin results in no winning outcomes. The bonus mode counter 220 is decremented to 2. A wager is required for the next spin and is accepted.

Spin 15: The fifteenth spin results in two line pays, which are awarded. One of the line pays is multiplied by three because it contains a 3× Wild symbol. The bonus mode counter is decremented to 1. A wager is required for the next spin and is accepted.

Spin 16: The sixteenth spin results in no winning outcomes. The bonus mode counter 220 is decremented to 1. A wager is required for the next spin and is accepted.

Spin 17: The seventeenth spin results in no winning outcomes. The bonus mode counter is decremented to 0 and removed from the display. Bonus mode is terminated, and the effects of the "Frenzy" and "Instant Win" game features are removed from the game rules. The game returns to normal base game play. A wager is required for the next spin and is accepted.

Spin 18: The eighteenth spin results in no winning outcomes. A wager is required for the next spin. However, a cashout input is received and play of the game is terminated.

Spin 19: The spin example narrative provides an example of how paid spins, free spins and the application of one or more game elements to the game rules may interacts. In some cases, the game elements may be applied to paid spins and may be in effect when free spins are awarded. The game elements in effect at the time continue to be applied to the free spins and, if the free spins terminate prior to the expiration of the bonus mode, will once again be applied to the game rules during paid spins.

The recitations of a value input device for establishing a credit balance, an input device for accepting a wager input that initiates a spin, and a value output device for paying out the credit balance are integrally incorporated within the steps of the data processing method. For example, the presentation of game outcomes through the spinning and stopping of the reels is essential to the game outcome determinations, which may only be initiated by the accepted wager input. Furthermore, a value input device for establishing a credit balance, an input device for accepting a wager that initiates a spin, and a value output device for paying out the credit balance are physical, structural elements that are not shared by generic or well-known computing devices but, rather, are particular to gaming machines.

Embodiments of the present invention realize benefits in increased computer processing efficiency with minimized processing overhead, fewer rules to be evaluated, fewer player inputs to be monitored, and simpler graphical representations. With respect to the game feature triggering process, if no coin symbol appears in the array at step 310, the game-logic circuitry foregoes any random determination of whether a game feature will be awarded. Furthermore, if any coin symbols do appear in the array, regardless of the number of pots and associated game features that may be won in parallel, only a single invocation of the RNG at step 326 is required to determine whether any game feature will actually be triggered. In contrast, in typical prior art systems with mystery bonus triggers, the game-logic circuitry makes a random determination in each and every wagering game cycle and for each and every game feature that may be won, thereby reducing processing efficiency compared to the method presented herein. Furthermore, use of a sliding range from which values are randomly selected provides multiple outcome paths with only one additional RNG call, rather than predefining an exhaustive list of possible scenarios in configuration files, memory, etc.

In this description, numerous specific details are set forth. However, it is understood that embodiments of the invention may be practiced without these specific details. For example, the displayed size of a perceived persistence/true persistence persistent element may partially represent the likelihood that its associated game feature will be triggered.

Some embodiments of the present invention comprise an innovative application of data processing steps that, when implemented by game-logic circuitry, direct a presentation assembly to present a symbol-value collection, selection, and award process that minimizes processing overhead by utilizing numbered indicia to represent credit values instead of complex, fanciful game images. In this way, these value-bearing symbols require fewer rules needed for the award process than would be necessary for calculating values of winning symbol combinations enumerated in stored paytables, as found in more complex reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-award process that can be easily adapted to any theme/brand while remaining easily understood by players.

While the examples given with respect to method 1100 portray that awarding of an additional game feature when the game is already in a bonus mode may extend the bonus mode for all currently applied game features by a certain number of spins, in some embodiments, each persistent element has its own independent bonus mode counter. Once the counter for a particular persistent element expires, that persistent element's game feature application is removed from the game rules at step 1118. The game features associated with any other active persistent elements continue to be applied. Thus, as long as one persistent element's bonus mode counter is active, the bonus mode remains active and, when all persistent element's counters are inactive, the bonus mode is inactive. When the various game features are independently applied and removed while free spins may also be separately enabled and disabled, a rich and varied game experience results.

In other instances, well-known circuits, structures and techniques have not been shown in detail in order not to obscure the understanding of this description. Note that in this description, references to "one embodiment" or "an embodiment" mean that the feature being referred to is included in at least one embodiment of the invention. Further, separate references to "one embodiment" in this description do not necessarily refer to the same embodiment; however, neither are such embodiments mutually exclusive, unless so stated and except as will be readily apparent to those of ordinary skill in the art. Thus, the present invention can include any variety of combinations and/or integrations of the embodiments described herein. Each claim, as may be amended, constitutes an embodiment of the invention, incorporated by reference into the detailed description. Moreover, in this description, the phrase "exemplary embodiment" means that the embodiment being referred to serves as an example or illustration.

Block diagrams illustrate exemplary embodiments of the invention. Flow diagrams illustrate operations of the exemplary embodiments of the invention. The operations of the flow diagrams are described with reference to the example embodiments shown in the block diagrams. However, it should be understood that the operations of the flow diagrams could be performed by embodiments of the invention other than those discussed with reference to the block diagrams, and embodiments discussed with references to the block diagrams could perform operations different than those discussed with reference to the flow diagrams. Additionally, some embodiments may not perform all the operations shown in a flow diagram. Moreover, it should be understood that although the flow diagrams depict serial operations, certain embodiments could perform certain of those operations in parallel or in a different sequence.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

What is claimed is:

1. A method of operating a gaming machine, the method comprising the operations of:

accepting, via a value input device, a physical item associated with a monetary value to establish a monetary balance;

conducting, by game-logic circuitry, a game including:

presenting, by a presentation assembly, a plurality of symbol-bearing reels, an array, and a plurality of persistent elements, each persistent element having an associated game feature and an associated accumulation symbol;

spinning and stopping the plurality of reels to land symbols from the reels in the array; and in response to the landed symbols including at least one accumulation symbol:

animating an addition of the at least one accumulation symbol to its associated persistent element; and randomly determining whether or not to award the game feature associated with the persistent element associated with the at least one accumulation symbol; and in response to awarding the game feature associated with the persistent element associated with the at least one accumulation symbol, implementing the game feature via the game-logic circuitry, wherein the implementing comprises applying changes associated with the game feature to game conditions currently in effect for a set of bonus spins comprising a combination of purchased spins and free spins and removing the applied changes upon completion of the bonus spins, wherein the changes associated with the game feature comprise, upon the landed symbols including a catalyst symbol, awarding values borne by one or more value-bearing symbols landed in the array; and receiving, via at least one of one or more electronic input devices, a cash out input that initiates a payout from the monetary balance via a value output device.

2. The method of claim 1, wherein the set of bonus spins comprises a subset of free spins preceded by a subset of purchased spins.

3. The method of claim 1, wherein the set of bonus spins comprises a subset of purchased spins preceded by a subset of free spins.

4. The method of claim 1, wherein the set of bonus spins comprises a predetermined number of spins.

5. The method of claim 1, wherein the set of bonus spins comprises a randomly determined number of spins.

6. The method of claim 1, wherein the gaming machine is regulatorily approved and primarily dedicated to playing a wagering game.

7. The method of claim 1, wherein the animating operation includes increasing a size of the persistent element or a volume of items therein.

8. The method of claim 7, wherein randomly determining whether or not to award the game feature associated with the persistent element is based, at least in part, on the size of the persistent element or the volume of items therein.

9. The method of claim 1, wherein the changes associated with the game features comprise modification of the symbols borne by the plurality of reels, the modification including a wild multiplier.

10. A gaming machine comprising:

a presentation assembly;

a value input device configured to accept a physical item associated with a monetary value to establish a credit balance;

a value output device configured to dispense a payout from the credit balance in response to a cashout input; and game-logic circuitry configured to perform the operations of:

conducting a game including:

presenting, by the presentation assembly, a plurality of symbol-bearing reels, an array, and a plurality of persistent elements, each persistent element having an associated game feature and an associated accumulation symbol;

spinning and stopping the plurality of reels to land symbols from the reels in the array; and in response to the landed symbols including at least one accumulation symbol:

animating an addition of the at least one accumulation symbol to its associated persistent element;

randomly determining whether or not to award the game feature associated with the persistent element associated with the at least one accumulation symbol; and in response to awarding the game feature associated with the persistent element associated with the at least one accumulation symbol, implementing the game feature via the game-logic circuitry, wherein the implementing comprises applying changes associated with the game feature to game conditions currently in effect for a set of bonus spins comprising a combination of purchased spins and free spins and removing the applied changes upon completion of the bonus spins, wherein the changes associated with the game feature comprise, upon the landed symbols including a catalyst symbol, awarding values borne by one or more value-bearing symbols landed in the array.

11. The gaming machine of claim 10, wherein the set of bonus spins comprises a subset of free spins preceded by a subset of purchased spins.

12. The gaming machine of claim 10, wherein the set of bonus spins comprises a subset of purchased spins preceded by a subset of free spins.

13. The gaming machine of claim 10, wherein the set of bonus spins comprises a predetermined number of spins.

14. The gaming machine of claim 10, wherein the set of bonus spins comprises a randomly determined number of spins.

15. The gaming machine of claim 10, wherein the gaming machine is regulatorily approved and primarily dedicated to playing a wagering game.

16. The gaming machine of claim 10, wherein the animating operation includes increasing a size of the persistent element or a volume of items therein.

17. The gaming machine of claim 16, wherein randomly determining whether or not to award the game feature associated with the persistent element is based, at least in part, on the size of the persistent element or the volume of items therein.

18. The gaming machine of claim 10, wherein the changes associated with the game features comprise modification of the symbols borne by the plurality of reels, the modification including a wild multiplier.

* * * * *